United States Patent
Wiedeman et al.

[19]

[11] Patent Number: 5,875,180
[45] Date of Patent: Feb. 23, 1999

[54] SATELLITE TELEPHONE INTERFERENCE AVOIDANCE SYSTEM

[75] Inventors: Robert A. Wiedeman, Los Altos; Paul A Monte; Vijaya K Gallagher, both of San Jose, all of Calif.

[73] Assignee: Globalstar L.P., San Jose, Calif.

[21] Appl. No.: 796,226

[22] Filed: Feb. 6, 1997

[51] Int. Cl.⁶ .................................................. H04J 13/00
[52] U.S. Cl. ............................................. 370/320; 455/63
[58] Field of Search ........................ 370/241, 242, 370/252, 310, 316, 317, 318, 319, 321, 322, 326, 327, 328, 329, 330, 331, 332, 333, 334, 336, 337, 341, 343, 344, 431, 436, 480, 496, 465, 468, 522; 455/63, 67.3, 428, 429, 430, 443, 12.1, 13.1, 13.4

[56] References Cited

U.S. PATENT DOCUMENTS

| | | |
|---|---|---|
| Re. 32,905 | 4/1989 | Baran . |
| 4,672,655 | 6/1987 | Koch . |
| 4,833,701 | 5/1989 | Comroe et al. . |
| 4,901,307 | 2/1990 | Gilhousen et al. . |
| 4,972,460 | 11/1990 | Sasuta . |
| 5,010,317 | 4/1991 | Schwendeman et al. ............ 340/311.1 |
| 5,073,900 | 12/1991 | Mallinckrodt ............................ 455/430 |
| 5,081,703 | 1/1992 | Lee . |
| 5,093,924 | 3/1992 | Toshiyuki ................................... 455/63 |
| 5,109,390 | 4/1992 | Gilhousen et al. . |
| 5,119,225 | 6/1992 | Grant et al. .............................. 359/172 |
| 5,159,701 | 10/1992 | Barnes et al. . |
| 5,216,427 | 6/1993 | Yan et al. ................................ 342/352 |
| 5,227,802 | 7/1993 | Pullman et al. .......................... 342/352 |
| 5,233,626 | 8/1993 | Ames . |
| 5,239,671 | 8/1993 | Linquist et al. ........................ 455/13.1 |
| 5,265,119 | 11/1993 | Gilhousen et al. . |
| 5,303,286 | 4/1994 | Wiedeman . |
| 5,319,796 | 6/1994 | Grube et al. .............................. 455/63 |
| 5,327,572 | 7/1994 | Freeburg ................................ 455/430 |
| 5,339,330 | 8/1994 | Mallinckrodt . |

(List continued on next page.)

FOREIGN PATENT DOCUMENTS

| | | |
|---|---|---|
| 0 421 698 A2 | 10/1991 | European Pat. Off. . |
| 3-269532 | 4/1993 | Japan . |
| WO 90/13186 | 11/1990 | WIPO . |
| WO 91/09473 | 6/1991 | WIPO . |
| WO 93/09613 | 5/1993 | WIPO . |

OTHER PUBLICATIONS

Petition of American Mobile Satellite Corporation Before the FCC, Washington, DC 20554, dated Jun. 3, 1991, pp. 1–15.

Application of Motorola Satellite Communications, Inc. for Iridium A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey[SM] before the FCC, Washington, D.C. 20554, May 31, 1991 pp. 33–51.

(List continued on next page.)

*Primary Examiner*—Huy D. Vu
*Attorney, Agent, or Firm*—Perman & Green, LLP

[57] ABSTRACT

A method is disclosed for operating a first satellite communications system of a type that operates co-frequency with at least one second transmission system, such as a second satellite communications system. The method includes steps, executed during the operation of the first satellite communications system, of measuring at a plurality of locations within a coverage area of the first system an amount of interference resulting at least in part from the at least one second transmission system, the amount of interference being measured over a band of frequencies allocated to the first system; (b) transmitting an indication of the measured interference from each location to a central site; and (c) in accordance with the transmitted indications, assigning at least one user terminal to a sub-band of frequencies within the band of frequencies so as to reduce an amount of interference experienced by the user terminal.

32 Claims, 15 Drawing Sheets

U.S. PATENT DOCUMENTS

| | | |
|---|---|---|
| 5,396,543 | 3/1995 | Beeson, Jr. et al. . |
| 5,410,728 | 4/1995 | Bertiger et al. .......................... 455/13.1 |
| 5,415,368 | 5/1995 | Horstein et al. .................... 244/158 R |
| 5,422,647 | 6/1995 | Hirschfield et al. ..................... 342/354 |
| 5,428,818 | 6/1995 | Meidan et al. ............................. 455/63 |
| 5,433,726 | 7/1995 | Horstein et al. .................... 244/158 R |
| 5,439,190 | 8/1995 | Horstein et al. ......................... 244/158 |
| 5,444,449 | 8/1995 | Poskett et al. ........................... 342/354 |
| 5,446,756 | 8/1995 | Mallinckrodt ............................ 375/200 |
| 5,448,623 | 9/1995 | Wiedeman et al. . |
| 5,452,471 | 9/1995 | Leopold et al. ........................ 455/12.1 |
| 5,551,624 | 9/1996 | Horstein et al. .................... 244/158 R |
| 5,603,082 | 2/1997 | Hamabe ..................................... 455/63 |
| 5,610,974 | 3/1997 | Lantto . |
| 5,625,867 | 4/1997 | Rouffet et al. ........................... 455/428 |
| 5,726,978 | 3/1998 | Frodigh et al. ............................ 455/63 |

OTHER PUBLICATIONS

Application of Ellipsat Corporation Ellipsat for the Authority to Construct Ellipso thu R I An Elliptical Orbit Satellite System, before the FCC, Washington, D.C. 20554, Nov. 2, 1990, pp. 5–34.

Application of Loral Cellular Systems, Corp., Globalstar Mobile Communications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

Current and Future Mobile Satellite Communication Systems, S. Kato et al., IEICE Transactions, vol. F 74, No. 8 Aug. 1991, pp. 2201–2210.

"Digital Network Oriented Mobile Radio Satellite System as an Integrated Part of the GSM Cellular Radio System in Europe", P. Dondl. Deutsch BUndespost/Fernmeldetechniches Zentralmt/Darmstadt, Sep. 21, 1989, Fed. Rep. Germ.

"The OmniTracs Mobile Satellite Communications and Positioning System", E. Tiedemann, Jr. et al., Vehicle Electronics in the 90's: Proceedings of the In'1. Congress on Transporation Electronics, Oct. 1990.

"Software Implementation of a PN Spread Spectrum Receiver to Accomodate Dynamics", C. Cahn et al., IEEE Trans, on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium System—A Revolutionary Satellite Communications System Developed with Innovative Applications of Technology", D. Sterling et al., IEEE, Milcom 1991, Nov. 4–7.

"Iridium: Key to Worldwide Cellular Communications", J. Foley, Telecommunications, Oct. 1991, pp. 23–28.

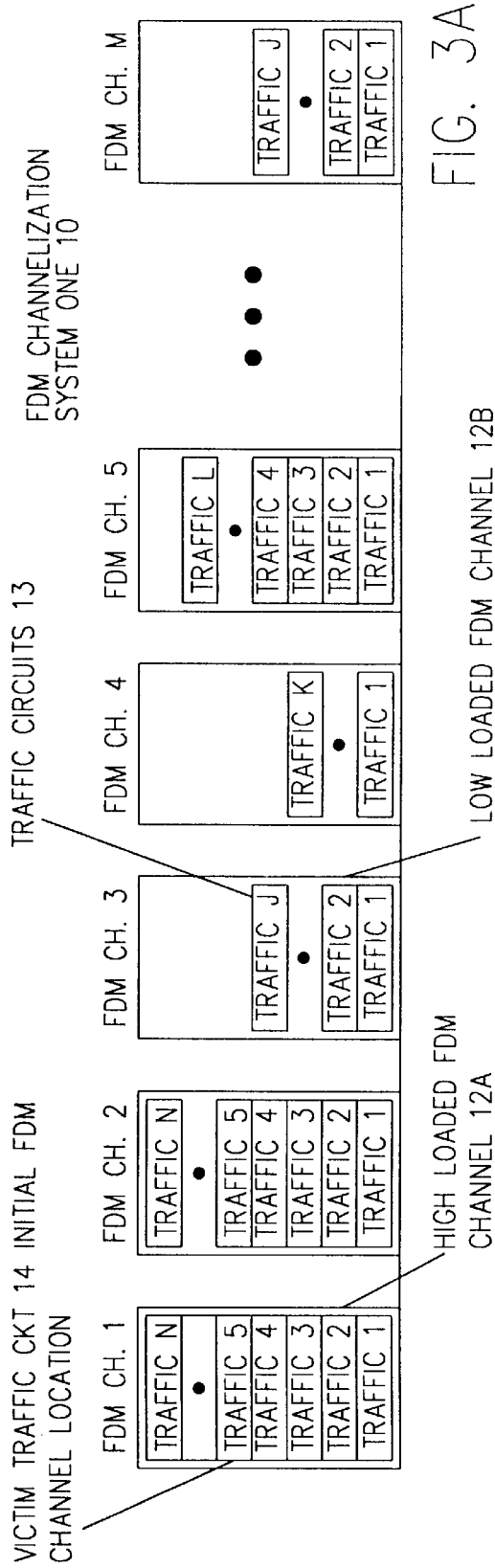
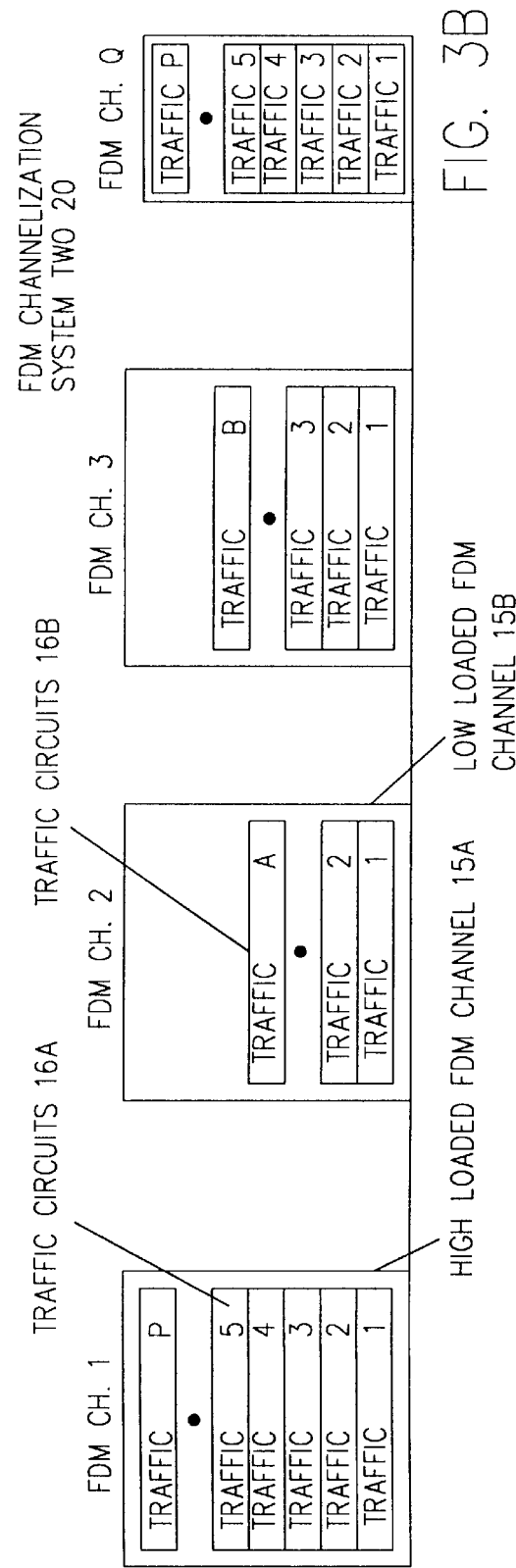
FIG. 3A
FIG. 3B

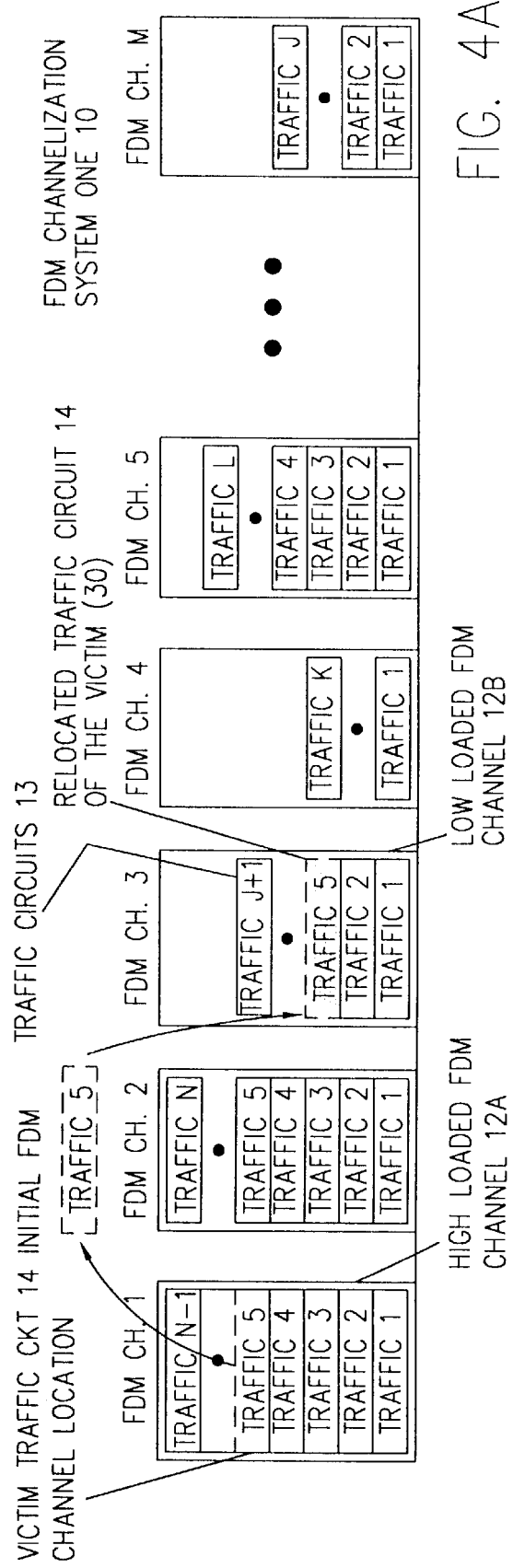
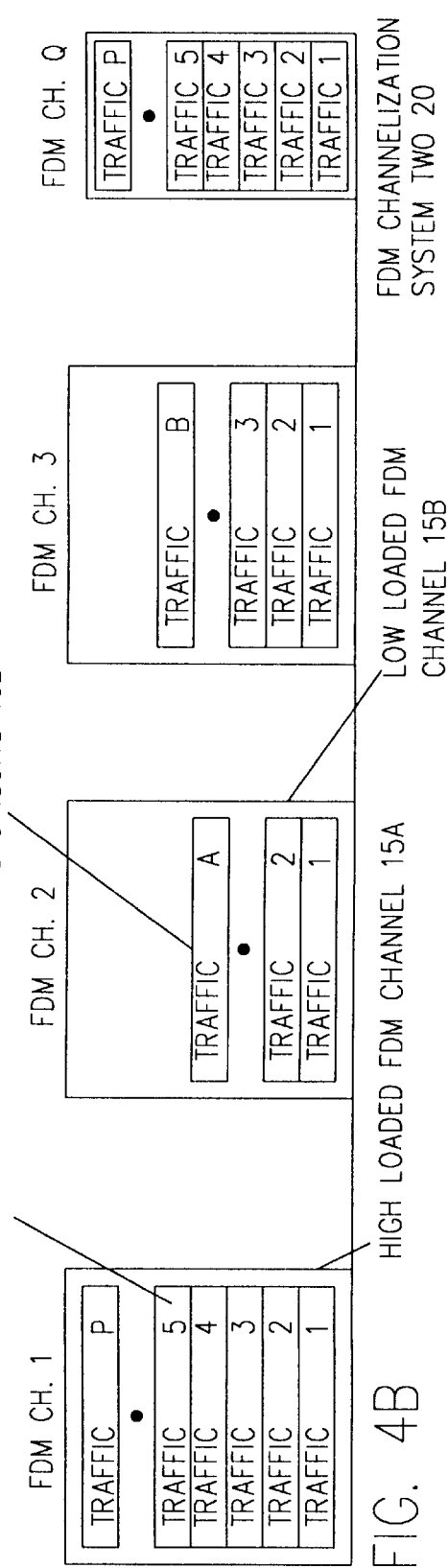
FIG. 4A
FIG. 4B

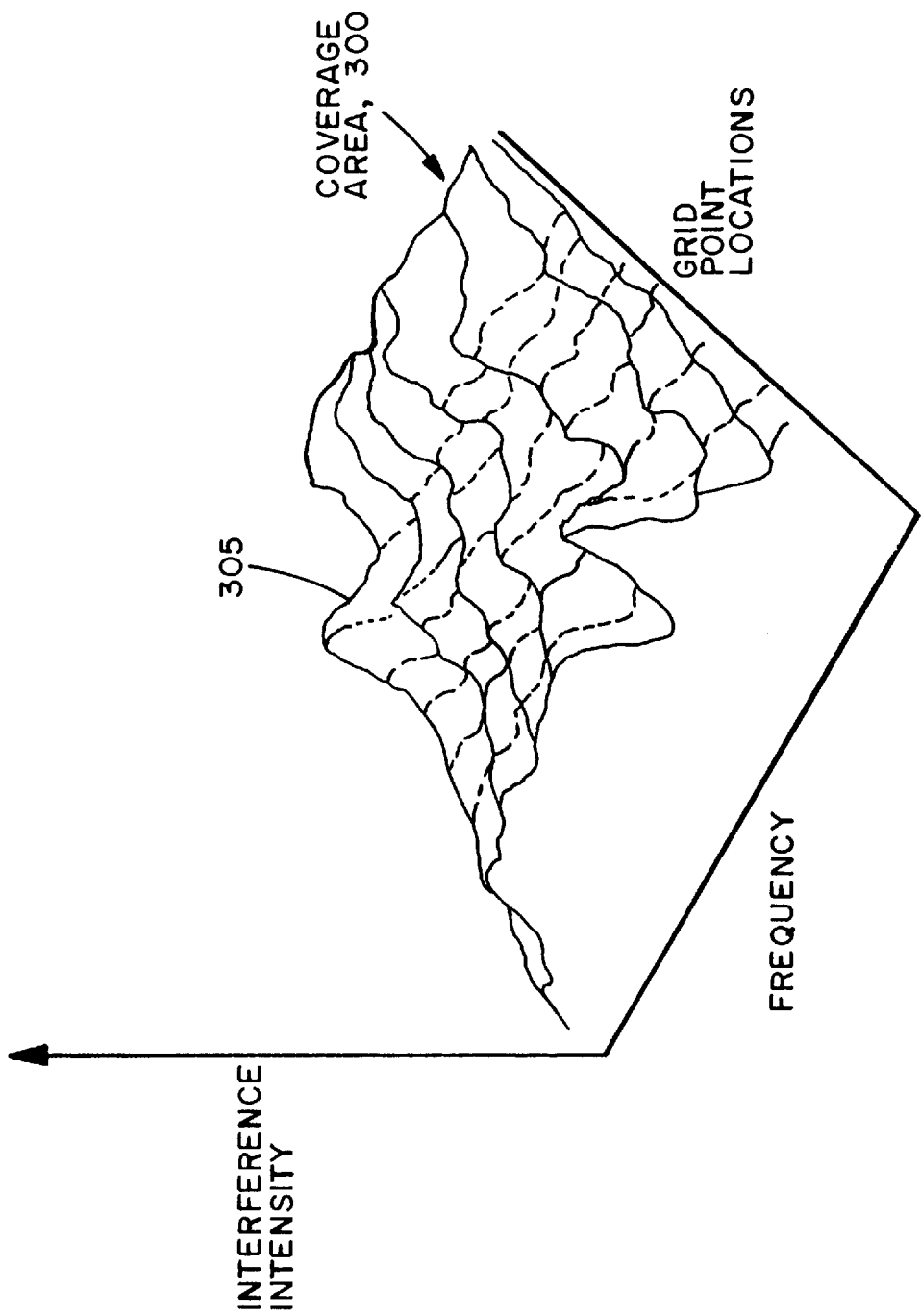

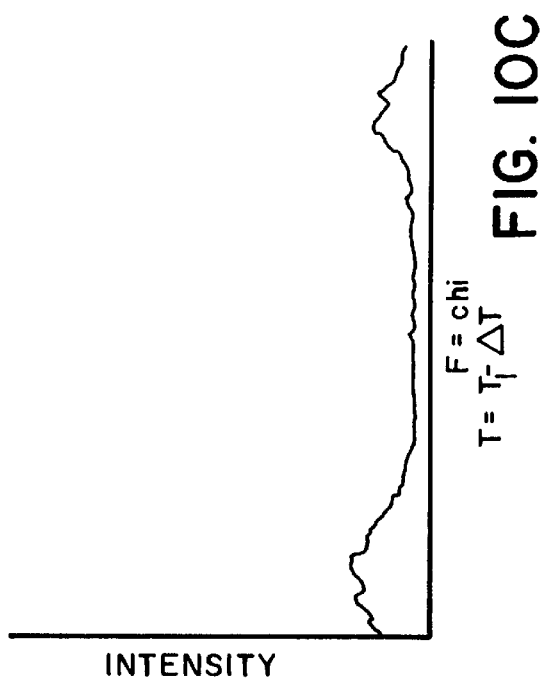
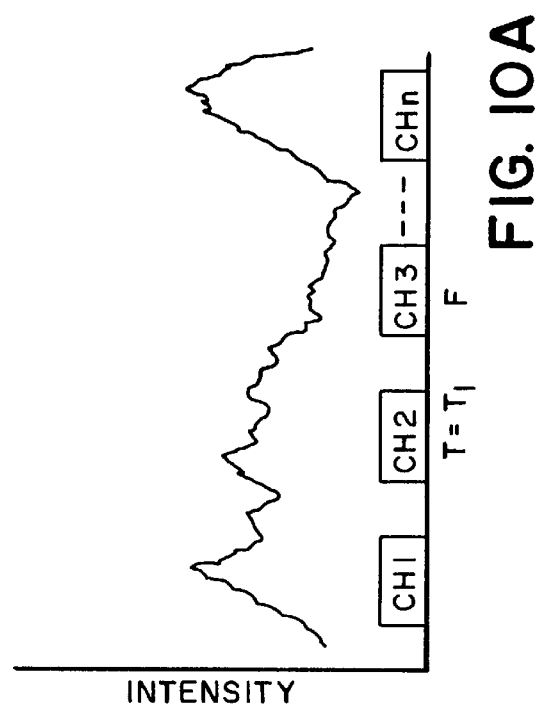
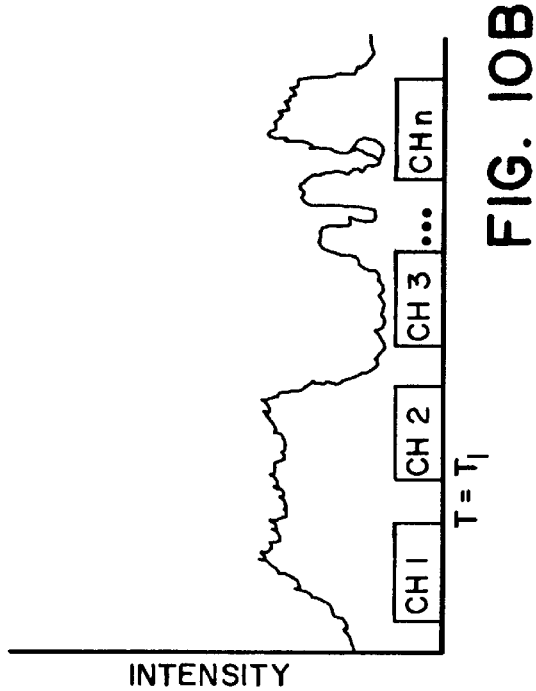

SATELLITE TELEPHONE INTERFERENCE AVOIDANCE SYSTEM

FIELD OF THE INVENTION

This invention pertains to satellite communications and to mobile satellite communications in particular.

BACKGROUND OF THE INVENTION

Satellite telephone systems are emerging as a new and important global business. These systems utilize many individual circuits routed through one satellite or a constellation of many satellites to provide communications for terrestrial terminals. One significant advantage of the satellite telephone system is that it provides ubiquitous coverage of large areas of the earth without requiring the construction of many small terrestrial cells.

Since a portion of the frequency spectrum has become available for these services, several proposals have been advanced for utilizing this spectrum. One proposal would use Time Division Multiple Access (TDMA), and several others would use Code Division Multiple Access (CDMA). An important feature of the CDMA systems is the ability to share the frequencies by co-frequency operation.

Traditionally, Frequency Division Multiple Access (FDMA) and TDMA systems have been "Band Split" in order to share a band of frequencies. For example, if a frequency band of width W is shared equally by two systems the resultant bandwidth for each system is W/2. However, two CDMA operators that would share the same bandwidth W would see considerably different results. The two CDMA operators would share the frequencies by operating co-frequency and share "interference" with each other. That is to say, the CDMA waveforms transmitted by each system would experience noise from the other system, and this noise would be present in their respective receivers when trying to recover the waveform that had been transmitted. Thus, one CDMA system will experience interference from another system. The two CDMA systems will add their respective capacities, less the amount of interference caused by each other. In effect, the sum or total capacity of the two CDMA systems can be greater than the whole.

In general, well-coordinated CDMA systems should be able to operate co-frequency in the presence of each other with about a 25% to 35% degradation in each system. Therefore, in this example, System One with a capacity of C when operating in the presence of System 2 with a capacity of D, once coordination has been effected, will have, by example, a capacity of C-25% and System Two will have a capacity of D-25%. If the systems were of the same efficiency and capacity then the resultant capacity of the spectrum used would be 1.5×C or 1.5×D.

In this discussion it is assumed that the two systems have "coordinated" with each other and exchanged technical data which allows co-frequency operation. Essential to this, for CDMA systems, is the concept of "coordinating" the Power Flux Density (PFD), at the ground, which is transmitted from each satellite. In general, the process contemplates each system operating with a maximum PFD, which is typically set by external standards such as the International Telecommunications Union (ITU) in order to prevent satellite interference into terrestrial systems. Of course, the two systems will typically not always be operating at the maximum PFD.

OBJECTS AND ADVANTAGES OF THE INVENTION

A first object and advantage of this invention is to provide a system and a method to optimize the capacity, to reduce user terminal and satellite power, and to improve the quality of the service delivered to users of a mobile communication satellite system.

A second object of this invention is to provide an array of terrestrial interference measuring terminals in a coverage area of a satellite communications system, and to use the outputs of the measurement terminals to intelligently assign and reassign user terminals to frequency channels.

SUMMARY OF THE INVENTION

The foregoing and other problems are overcome and the objects of the invention are realized by methods and apparatus in accordance with embodiments of this invention, wherein a method is disclosed for operating a first satellite communications system of a type that operates co-frequency with at least one second transmission system, such as a second satellite communications system. The method includes steps, executed during the operation of the first satellite communications system, of measuring at a plurality of locations within a coverage area of the first system an amount of interference resulting at least in part from the at least one second satellite communications system, the amount of interference being measured over a band of frequencies allocated to the first system; (b) transmitting an indication of the measured interference from each location to a central site, such as a gateway; and (c) in accordance with the transmitted indications, assigning at least one user terminal to a sub-band of frequencies (i.e., a frequency channel) within the band of frequencies so as to reduce an amount of interference experienced by the user terminal.

The step of transmitting includes a step of transmitting the indication through at least one satellite of the first satellite communications system, or through at least one satellite of a third satellite communications system (e.g., a VSAT system), or through a terrestrial data network.

The step of measuring is executed with a plurality of measurement terminals that are spatially distributed within the coverage area, and the method further includes a step of transmitting a command from the central site to at least one of the measurement terminals, the command specifying at least one measurement parameter, such as a frequency band within which to scan a receiver of the measurement terminal.

In a presently preferred embodiment of this invention the band of frequencies is channelized into a plurality of frequency channels and the system operates co-frequency with the second satellite communications system. In this preferred embodiment the step of assigning assigns or reassigns the user terminal from a first frequency channel to a second frequency channel.

The step of transmitting includes the steps of (a) receiving the transmitted indications at the central site; (b) subtracting an amount of self-interference from the transmitted indications to determine an amount of externally generated interference; and (c) forming a historical database of the externally generated interference within the coverage area. The step of assigning is performed at least in part based on a predicted interference level obtained from indications stored in the historical database.

In accordance with a further embodiment of this invention there is disclosed a method for operating a satellite communications system that includes the steps of monitoring, at a gateway, return links from a plurality of user terminals to determine an amount of interference experienced by the user terminals, the user terminals being assigned to different frequency channels and communicating with the gateway via at least one satellite; and, in accordance with the determined amount of interference, assigning or reassigning at least one of the user terminals to a different frequency channel so as to reduce an amount of satellite power required to provide a desired level of service quality to the user terminal.

BRIEF DESCRIPTION OF THE DRAWINGS

The above set forth and other features of the invention are made more apparent in the ensuing Detailed Description of the Invention when read in conjunction with the attached Drawings, wherein:

FIGS. 3A and 3B show an exemplary FDM channelization for the first and second satellite systems of FIG. 1, wherein FIG. 3A illustrates, for a desired system, a traffic distribution during operation without optimization by redistribution, while FIG. 3B illustrates the traffic distribution during operation for the interfering system.

FIGS. 4A and 4B also show an exemplary FDM channelization for the first and second satellite systems of FIG. 1, wherein FIG. 4A illustrates, for a desired system, a further exemplary traffic distribution during operation without optimization by redistribution, while FIG. 4B illustrates the traffic distribution during operation for the interfering system.

FIG. 8 is a representative map of interference at various grid points at a time $T_1$.

FIGS. 10A–10C are graphs of interference that are useful in understanding the operation of the measurement terminal of FIG. 9.

DETAILED DESCRIPTION OF THE INVENTION

In general, the satellite communications system in accordance with the teaching of this invention operates by sensing and storing external interference information relative to other satellite communication systems and/or other sources of interference, such as interference from fixed microwave and radar sources, or any other man-made noise sources. Next, either in real time or by comparing the sensed interference to previous (historical) values, the system maps the interference values, and uses the resultant information to switch communications traffic (also referred to herein simply as "traffic") to frequencies which are not experiencing any, or a lower amount, of external interference.

Figure 1:
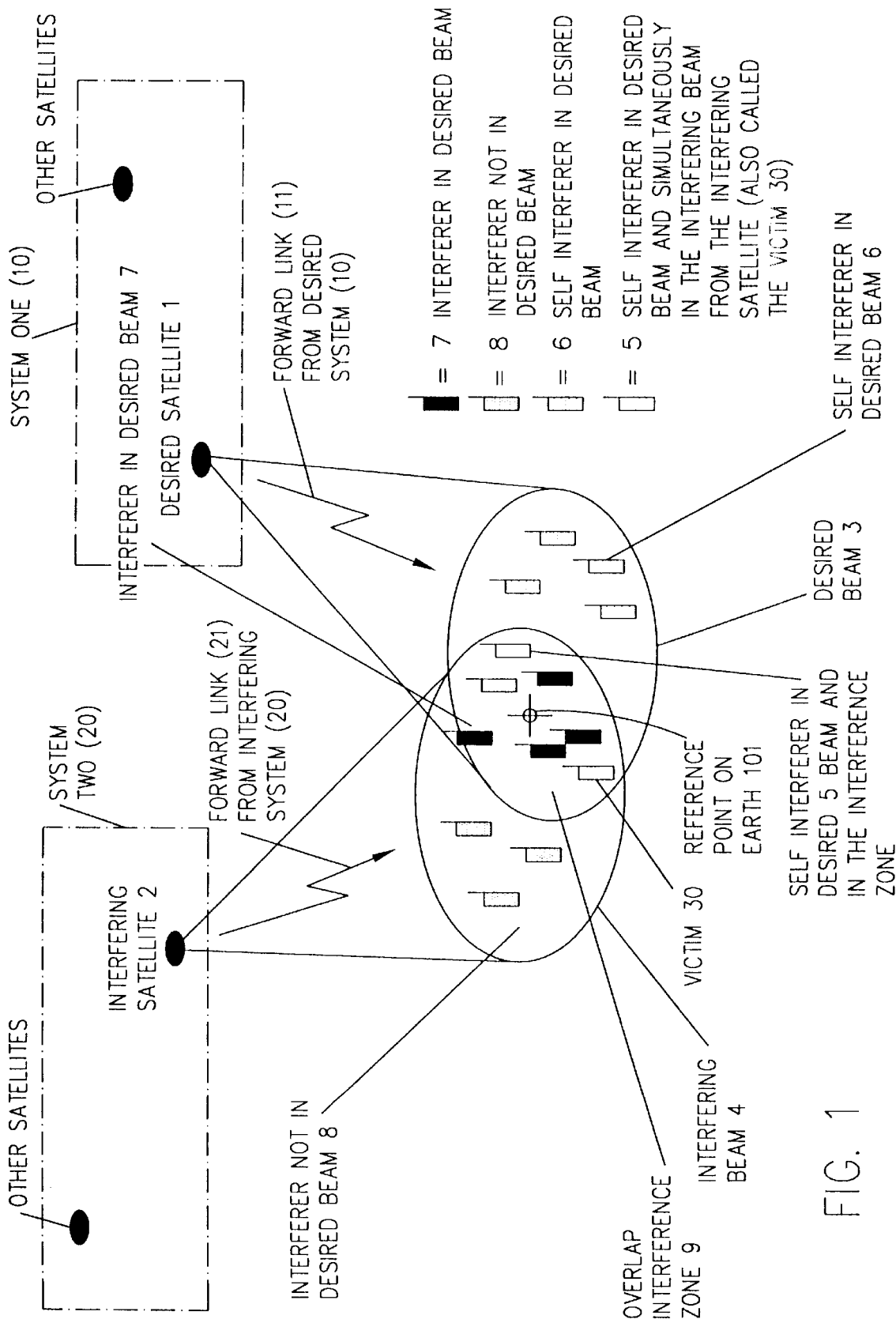
FIG. 1 is a simplified diagram of a satellite communication system, having first and second satellite systems, that is useful for understanding the teaching of this invention.

Referring now to FIG. 1, a description of an exemplary interference situation is made for, by example, a two satellite system configuration. It should be noted that three or more satellite systems may be involved, and also that the interference can arise from other space or terrestrial sources.

In FIG. 1 the two satellite systems are designated System One 10 and System Two 20. Each of these systems may include, by example, several low earth orbit (LEO) satellites 1 and 2. The teachings of this invention apply as well to satellites in other orbits, such as medium earth orbit (MEO) and geosynchronous orbit (GSO). In general, the interfering system (System Two) or desired system (System One), or both, may include only one satellite in any orbit.

As will also be shown below, one or both of the systems may be terrestrially based. Furthermore, the interfering system need not be a communications system, but could be a radar source, a fixed microwave source, or in general any transmitter that operates co-frequency with the desired system. Thus, although the invention will be described in the context of two satellite communication systems, it should be kept in mind that the teaching of this invention is not limited for use only with satellite communication systems.

As employed herein, the "desired" system or satellite is one through which a given user terminal obtains service. For example, a user terminal may be capable of transceiving CDMA communications, and there may be a plurality of CDMA based satellite communications systems, each having associated satellites and ground stations. However, for various reasons the user terminal will typically only be capable of obtaining service through one of the CDMA satellite communications systems. This system is thus the "desired" system, and the one or more other systems are simply the "interfering" system or systems.

The following U.S. Patents teach various aspects of a LEO satellite constellation, and the associated communication system, which may be used to implement the System One 10: U.S. Pat. No. : 5,552,798, issued Sep. 3, 1996, entitled "Antenna for Multipath Satellite Communication Links", by F. J. Dietrich and P. A. Monte; U.S. Pat. No. : 5,422,647, issued Jun. 6, 1995, entitled "Mobile Communication Satellite Payload", by E. Hirshfield and C. A. Tsao; U.S. Pat. No. : 5,504,493, issued Apr. 2, 1996, entitled "Active Transmit Phased Array Antenna with Amplitude Taper", by E. Hirshfield; U.S. Pat. Nos. 5,448,623, issued Sep. 5, 1995, and 5,526,404, issued Jun. 11, 1996, "Satellite Telecommunications System Using Network Coordinating Gateways Operative with a Terrestrial Communication System", by R. A. Wiedeman and P. A. Monte; and U.S. Pat. No. 5,233,626, issued Aug. 3, 1993, entitled "Repeater Diversity Spread Spectrum Communication System", by S. A. Ames. The disclosures of these U.S. Patents is incorporated by reference herein in their entireties. As will be made apparent below, these teachings are modified so as to provide methods and apparatus for obtaining a map of interference and for using the obtained map to allocate user terminals to frequency channels.

In a presently preferred, but not limiting, embodiment of this invention the constellation of satellites that comprise a portion of System One 10 includes satellites 1 at an altitude of ≈1400 km in eight circular planes offset by 45°, inclined at 52° relative to the equator with six satellites 10a in each plane (which may be referred to as a Walker constellation). To optimize the effectiveness of the coverage, path diversity is employed to mitigate against local obstructions such as trees, buildings, and mountains. Path diversity requires that a user terminal on the ground have a simultaneous view of two or more satellites at elevations above about 10° over the horizon. The LEO constellation described above provides multiple satellite coverage.

Referring again to FIG. 1, the System One 10 includes at least one "desired" satellite 1 which transmits a beam 3 toward the earth. This beam 3 is formed of many Forward Links 11 which are directed toward many desired user terminals 5 and 6. The desired terminals 5 and 6 are connected via the satellite 1 to gateways (not shown) of the System One. The interfering System Two 20 also includes a satellite 2 which transmits a beam 4 toward the earth. This beam is formed of many Forward Links 21 which are directed toward many undesired interfering system user terminals 7 and 8. The systems 10 and 20 have an overlapping coverage area. For the exemplary LEO system, the two beams 3 and 4 are moving with respect to each other, however this is not a condition which is necessary. At any instant the beams may overlap. The zone which is formed by the beam overlap is referred to herein as the overlap interference zone 9. The overlap interference zone 9 may be referenced at any instant in time to a reference point 101 on the surface of the earth.

The desired system 10 may have user terminals within the interference zone 9 and outside of this zone. The user terminals outside of the overlap interference zone 9 are referred to herein as self interferers 6 in the desired beam 3. The user terminals inside of the overlap interference zone 9 are referred to herein as self interferers 5 in the desired beam 3, which are simultaneously in the interfering beam 4 from the interfering satellite 2. To aid in the explanation of this invention, one of the user terminals 5 in the interference zone 9 is referred to for convenience as the "victim" user terminal 30. An object of this invention is to assign or reassign the victim user terminal 30 to a frequency channel (i.e., a sub-band of the band of frequencies used by the desired system 10) which is experiencing a lower level of interference. This is done in order to reduce the satellite power required to deliver the same quality of service to the victim user terminal 30. The quality of service may be indicated by, for example, some predetermined minimum signal to noise ratio at the user terminal and/or by some maximum symbol error rate or frame error rate.

The interfering system 20 serves user terminals which are both in the interference zone 9 and outside of it. The desired system user terminals 5 and 30 receive interference from power directed toward both interferer user terminals 7 located within the overlap zone 9 and towards interferer user terminals 8 located outside of the interference zone 9. Thus the victim user terminal 30 receives interference from the following sources, as long as the interferers are operating co-frequency and the victim user terminal 30 has a receiver bandwidth wide enough to receive the transmissions: (a) interference from power transmitted from satellite 1 towards self interferer 5; (b) interference from power transmitted from satellite 1 towards self interferer 6; (c) interference from power transmitted from satellite 2 towards self interferer 7; and (d) interference from power transmitted from satellite 2 towards self interferer 8.

However, the amount of interference from these sources is not constant, and varies with both time and frequency. Optimization of the use of the total frequency available according to traffic assignment is therefore possible and is an advantage of the use of this invention.

Figure 2A:
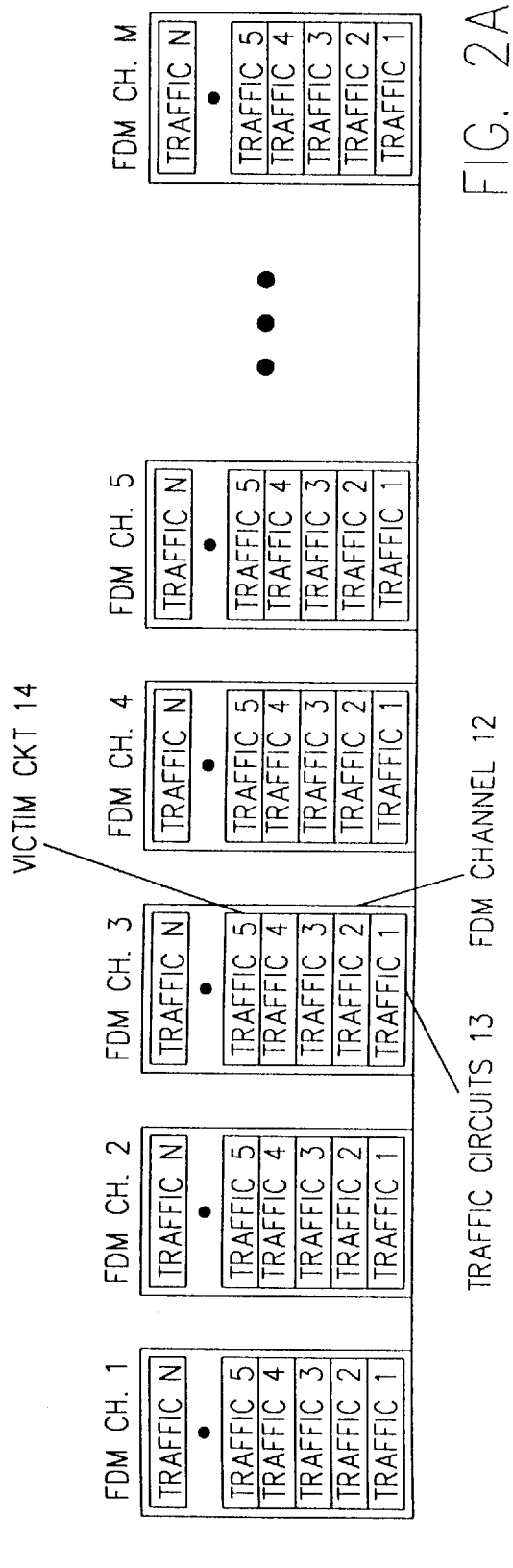
FIGS. 2A and 2B show an exemplary FDM channelization for the first and second satellite systems, respectively, of FIG. 1.
Figure 2B:
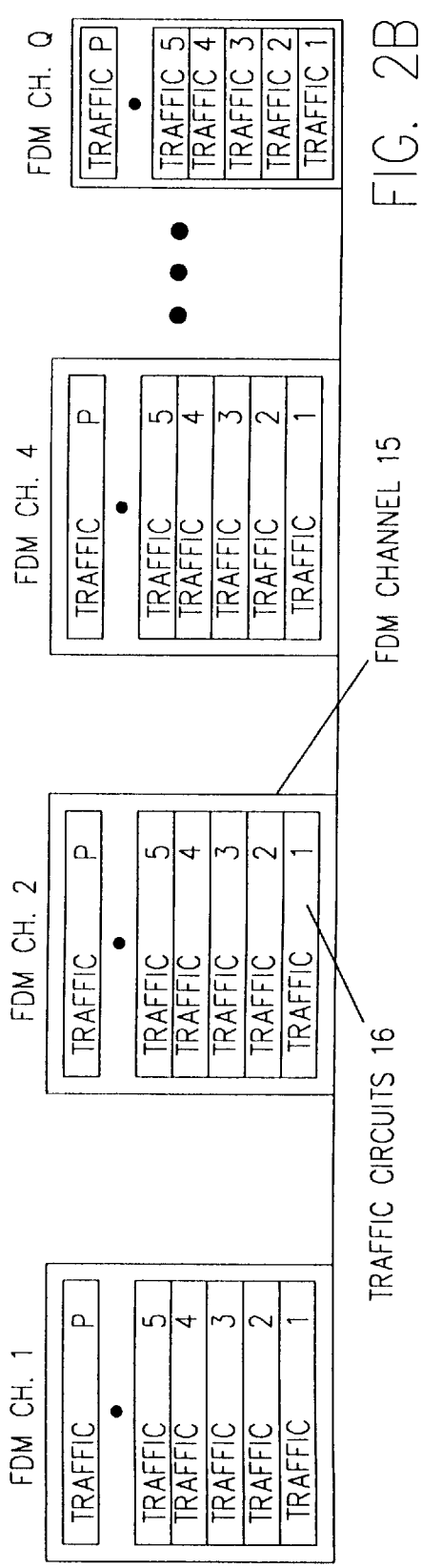

A principle of operation of this invention can be understood with reference to FIGS. 2A and 2B, wherein the general configuration of traffic channels delivered from a CDMA satellite telephone system is described.

By way of background information, and treating only the CDMA case, several proposals for CDMA systems have been authorized and granted licenses to construct satellite telephone systems and operate the system world wide. One of the conditions of this license is that the systems operate co-frequency and share the approved bandwidth. The technical design and coordination between these systems is left up to the licensee. The total bandwidth authorized for CDMA systems 10, 20 for the forward link is 16.5 MHz, but this particular bandwidth is not a limitation upon the practice of this invention. In general, the proposals for CDMA systems have used a combination of Frequency Division (FD) and CDMA utilizing Spread Spectrum (SS), or FD-SS-CDMA, as the modulation technique for transmission from the satellites. In principle this means that the spectrum is divided into some number of known bandwidth pieces or segments. The bandwidth of each segment is related to the technical characteristics of the transmission requirements for each system and is not necessarily the same. In fact, the bandwidth of each segment between systems is generally different. For the systems proposed, and shown by example herein, System One 10 has a single channel bandwidth of 1.25 MHz and occupies 13 FDM channels within the 16.5 MHz of total bandwidth available. System Two, again by example, has a single channel bandwidth of 2.5 MHz and occupies 6 FDM channels within the 16.5 MHz of spectrum. As shown in the diagrams of FIGS. 2A and 2B it is not necessary for all FDM channels to have the same individual channel bandwidths. Within each of the FDM channels shown there can be from 1 to N traffic circuits, in the diagram these are labeled "traffic". Being a CDMA system, these traffic channels are separated from each other by various Walsh Codes and are distinguished from each other by code. Thus, each of the satellite systems uses two different methods of multiple frequency access, both CDMA and FDMA. The systems do not necessarily have to have the same number "N" of circuits in each FDM channel, and generally do not. The total possible circuits possible on the forward link for System One (FIG. 2A) can be derived from the equation:

$$\text{Circuits System One Max} = M(\text{channels}) \times N(\text{circuits}).$$

Likewise, the total circuits for System Two (FIG. 2B) can be derived from the equation:

$$\text{Circuits System Two Max} = P(\text{circuits}) \times Q(\text{channels}).$$

In fact, each system does not utilize all of the possible traffic circuits due to an inefficiency referred to as self interference and external interference. Self interference to the victim user terminal 30 is caused by the system 10 transmitting on the same FDM channel to other circuit users.

Consider now an individual desired FDM channel 12 having some number of traffic circuits 13 and one victim traffic circuit 14 (e.g., traffic circuit 5 in FDM channel 3). If there is no method of reducing the "self" interference caused by the other traffic circuits 13 into the victim traffic circuit 14 the satellite 1 is required to increase the transmitted power to the victim user terminal 30 to combat the "self" interference caused by these other traffic circuits 13. Fortunately, there are methods to reduce this self interference, such as by employing known types of orthogonal spreading codes inside a given one of the FDM channels. For the purposes of this invention the use of orthogonal spreading codes is assumed. However, it should be realized that the teaching of this invention applies as well to non-orthogonal self interference, as well as to externally generated interference. It should also be realized that the teachings of this invention are not limited solely for use with CDMA systems.

Considering now the channelization of System Two 20, as shown in FIG. 2B, there is some number Q of FDM channels 15 each of which contains some number P (which can be different for each channel) of traffic circuits 16. The interference into FDM channel No. 3 of System One from FDM channel No. 2 of System Two is referred to herein as "external" interference. This interference cannot be eliminated by the method described above since, by example, System Two may not be using orthogonal spreading codes and, even if it does, it may not in general coordinate its synchronizing pilot channel with System One. In order to maintain the same quality of service without this interference the satellite system 10 must compensate by transmitting the signal to the victim user terminal 30 at a higher power. A further advantage of this invention is thus providing a technique to avoid or lower the requirement for this excess power transmission, as the conservation of satellite power is generally of great importance in satellite communications systems.

Reference is now made to FIGS. 3A and 3B where it is shown that the traffic loading of these channels, both on the desired system 10 and the interfering system 20, is not uniform in time or in frequency. By example, FDM channel No. 3 in the desired System One 10 may be loaded with only "J" circuits, while at the same time FDM channel No. 2 in the interfering System Two 20 may be loaded with only "A" circuits. At the same time FDM channel No. 1 in the desired System One may be fully loaded with "N" circuits (including the Victim circuit 30 using Walsh Code 5 in the channel), and at the same time FDM channel No. 1 in the interfering System Two 20 is also fully loaded with "P" circuits. Thus the victim user terminal 30 is experiencing maximum interference, while a user in FDM channel 3 is experiencing significantly less interference.

This invention exploits the possibility to identify the source of the interference, predict its behavior, and re-assign user terminals to the lower utilization channels, enabling the System One 10 to operate more efficiently with less system power being used after the reassignment of the victim user terminal 30. This invention also provides an ability to initially assign user terminals to the lower utilization channels.

The reassignment of the victim user terminal 30 is illustrated in FIGS. 4A and 4B. In this process, the victim user terminal 30 traffic circuit 14 is initially in, by example, FDM channel No. 1 of the desired System One 10. In accordance with this invention the system 10 senses that the external interference in FDM channel No. 3 is low due to low channel occupancy by the interfering system 20. Since the interfering FDM Channel 1 of System Two is co-channel with FDM Channel 1 of System One, while interfering FDM channel No. 2 of System Two, which is relatively lightly loaded, is co-channel with FDM Channel 3 of System One, a transfer of the traffic circuit 14 of the victim user terminal 30 from System One channel 1 to System One channel 3 provides decreased power requirements on System One. This is true for two reasons. First, the power to overcome interference into the victim's traffic circuit is reduced. Second, the increased power in other user terminals to combat the victim's self interference is reduced. Since the increased power in FDM channel 3, resulting from adding the relocated traffic circuit 14 from FDM channel 1, is less than the power to support it in the original channel (FDM channel 1), a reduction in overall satellite power to support the user is achieved. This power in turn may be used to add more users to the system 10 (i.e., increase capacity), or alternatively results in less power drain on the satellite batteries, thus making possible additional revenue traffic circuits on the same satellite at this time or a later time in its orbit.

In order to reallocate traffic channels, as described above, to effect the optimization of the use of the FDM channels it is necessary to have some knowledge of the interfering system 20, and to be able to eliminate self interference. Since the traffic density in the FDM channels is fairly long term (seconds or minutes) as compared to the frame transmission time of the desired system (on the order of 20 milliseconds) it is possible to calculate the apparent external interference at the gateway based on information available, or input to the gateway by measurement, and thus provide instructions to the desired user terminals by command.

Figure 5:
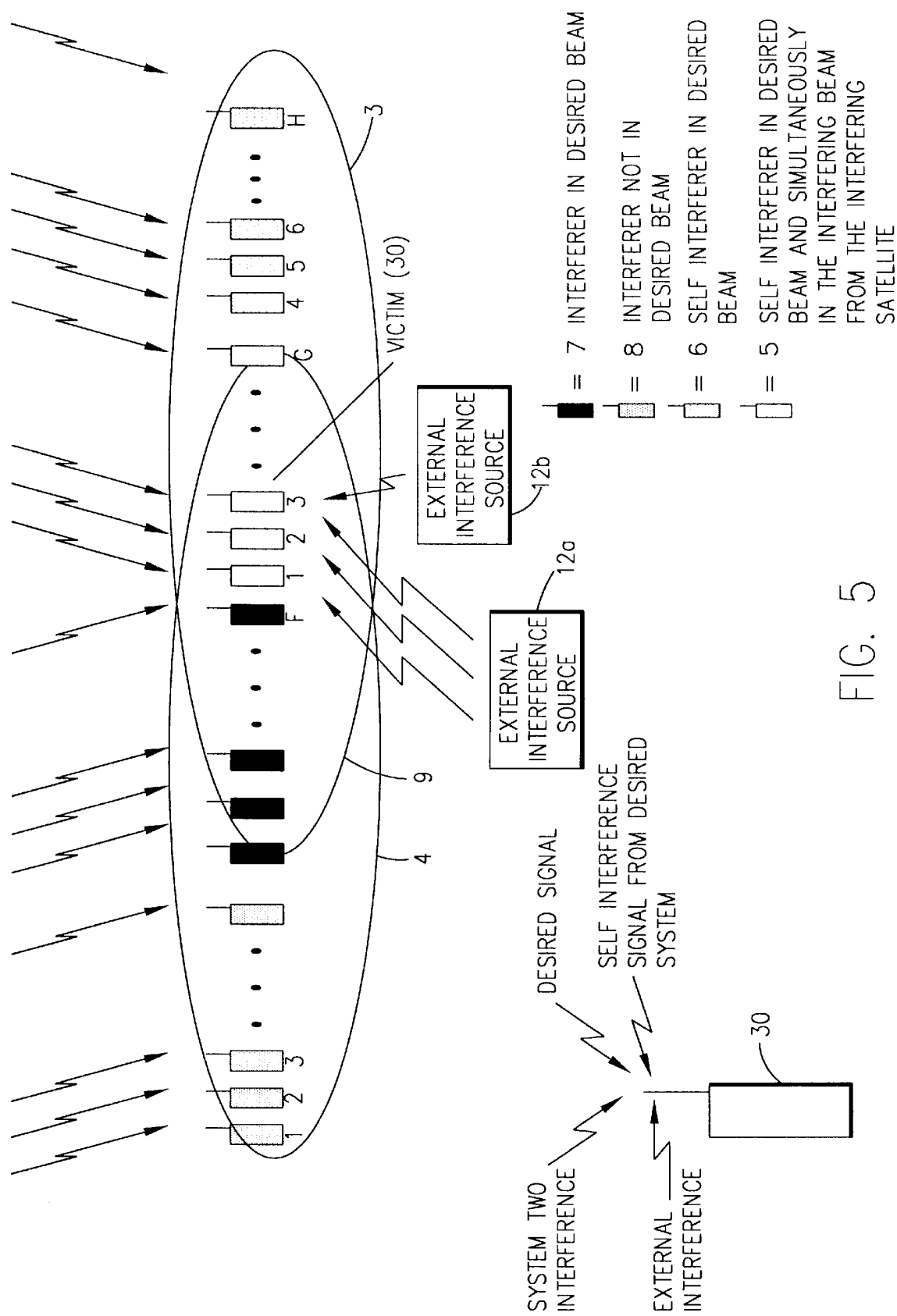
FIG. 5 is simplified block diagram that illustrates various signal sources for a user terminal, including a desired signal and a plurality of interference sources.

Reference is now made to FIG. 5, wherein it is shown that the power directed toward user terminals 1 to F of the interfering System Two 20 appears in the overlap zone 9 of the beams 3 and 4, and thus interferes with desired users 1 to G located in the overlap zone 9, even if some or all of the interfering users 1 to F are not in the overlap zone 9. On the other hand, this interference is not seen by the user terminals 4-H in the desired beam 3, since these user terminals are not located in the overlap zone 9. The desired user terminals 1-G in the overlap zone 9 thus receive interference from interferers 1 to F of the interfering System Two, self interferers 1 to G from the desired System One in the overlap zone 9, the self-interferers 4 to H located outside of the interference zone 9, and any non-System Two other external interference from various sources (designated as 12a and 12b). The victim user terminal 30 located in the overlap zone 9 experiences all of this interference, as shown in the lower left corner of FIG. 5.

In general, and without the benefit of the teaching of this invention, the source of the interference cannot be determined by the user terminals, and only the effect of this interference is known at the gateway, since it responds by increasing the satellite transmit power to aid the user in maintaining communications.

A further advantage of this invention is to identify the source of the interference, to search for a more benign frequency that experiences less interference, and to instruct the user terminal to change frequencies (or to initially tune to a particular frequency) to reduce interference, thereby lowering the power requirements. To accomplish these functions it is thus necessary to map the frequency-interference domain to identify the source of the interference, and to provide information and a method for relocation of the victim user terminal 30.

Figure 6:
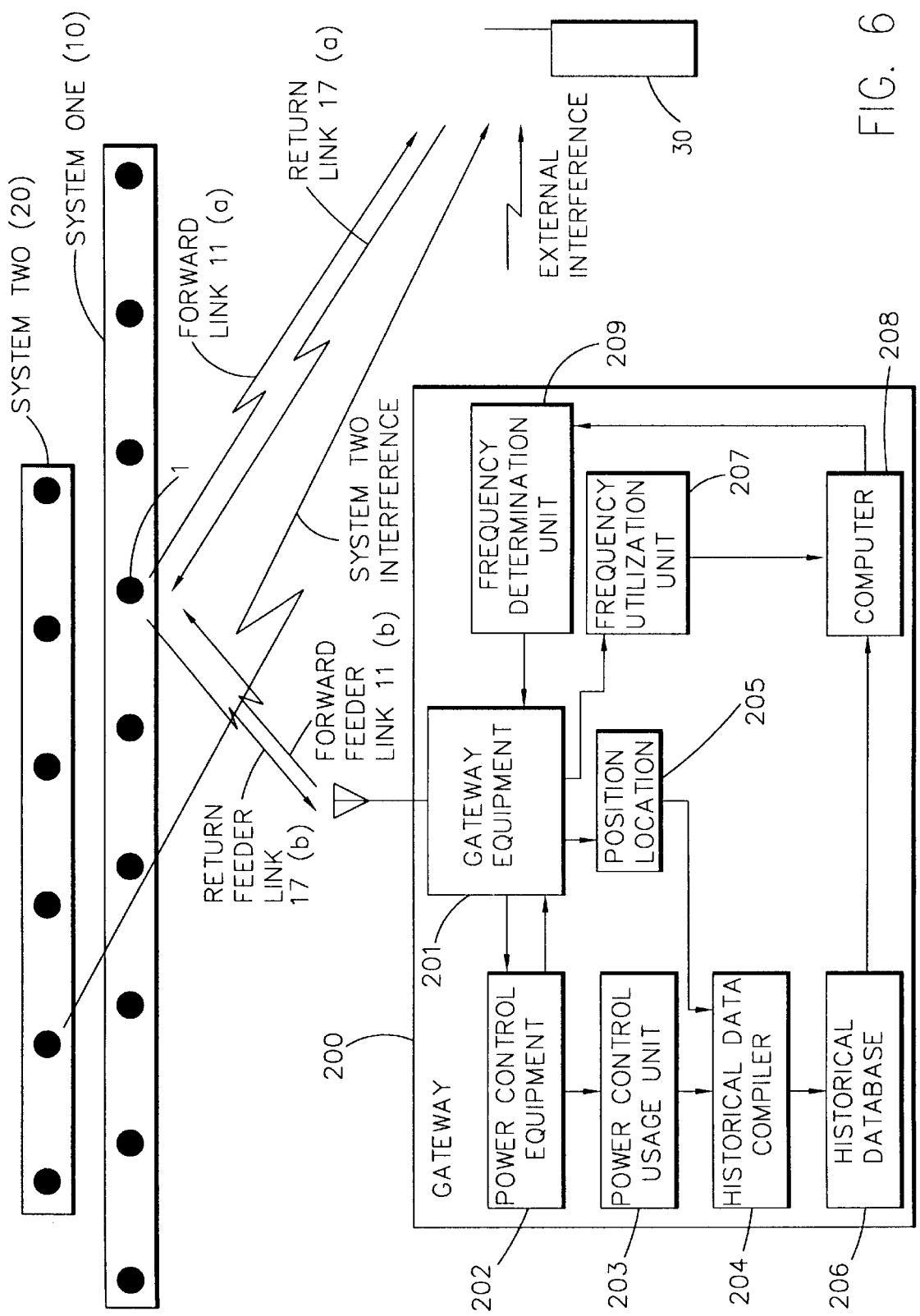
FIG. 6 is a simplified block diagram of a satellite communication system ground station or gateway, and shows the gateway communication with a user terminal through a satellite of the desired system.

A first method in accordance with this invention is to collect information from a number of desired system users and to develop a historical database. FIG. 6 illustrates an embodiment of a gateway 200 for executing this method. The user terminals are in communication with the gateway 200 via the satellite 1 of the desired satellite communications system 10. Although one gateway is illustrated, it should be realized that typically there will be a plurality of same for servicing different geographical locations. The user terminal is assumed to be receiving desired signals and undesired signals as discussed above. By example, the victim user terminal 30 experiences self interference (not shown), System Two interference, and external interference on the Forward Link 11a. The evidence of this interference is sensed by the gateway 200 from, by example, a power control request from the user terminal 30 that is transmitted on the return link 17a and its associated return feeder link 17b. In general, the gateway 200, using its power control equipment 202, responds by increasing (or decreasing) the power used by the satellite 1 to overcome the interference. Since the location and the amount of power used by the user terminal 30 is known by the gateway 200, it is possible to quantize this information and store it in a historical database 206 for future or near real time usage. The self-interference may also be determined from a bit rate required in the channel to achieve reliable communications, or by the number of power-up commands that the gateway 200 is required to send to the user terminals.

To perform this function, the gateway 200 includes the following equipment. The above-mentioned power control equipment 202 performs the power control of the user terminals depending on output instructions from the gateway equipment 201. The information about the power used is sent to a power control usage unit 203 for filtering and other functions. The output of the power control usage unit 203 is input to a historical data compiler 204, where position location of the user terminal 30 from a position location unit 205 is combined. The combined data is then sent to the historical database 206 for future use. A frequency utilization unit 207 returns actual utilization of each channel during the period that user terminals are in communication. A computer 208 utilizes data from the historical database 206 and the frequency utilization unit 207 to plan the reassignment of the user terminals such that optimization of the channel usage is achieved. This process includes the calculation of self interference of the desired System One users, and an estimation of external interference and interference from System Two 20. Messages are sent to the frequency determination unit 209 to perform the reassignment of user terminals to other FDM channels where less interference is expected to be present. Newly added users terminals may also be assigned to selected FDM channels were less interference is expected to be present.

It should be noted that with this method it is not possible to distinguish between external interference, System Two interference, or propagation effects due to the user terminal 30 moving into or out of buildings, under trees, or other effects such as head blockage, specular reflection and other such propagation effects. However, this technique still aids in optimizing usage, since the total interference is of most concern in determining user terminal power, and not the source of the interference per se.

A second method for optimizing the utilization of satellite power and frequency utilization uses system interference measurements to distinguish between the propagation effects described above (e.g., user terminals moving in or out of buildings, etc.). This method involves making direct measurements of frequency spectrum utilization.

Figure 7A:
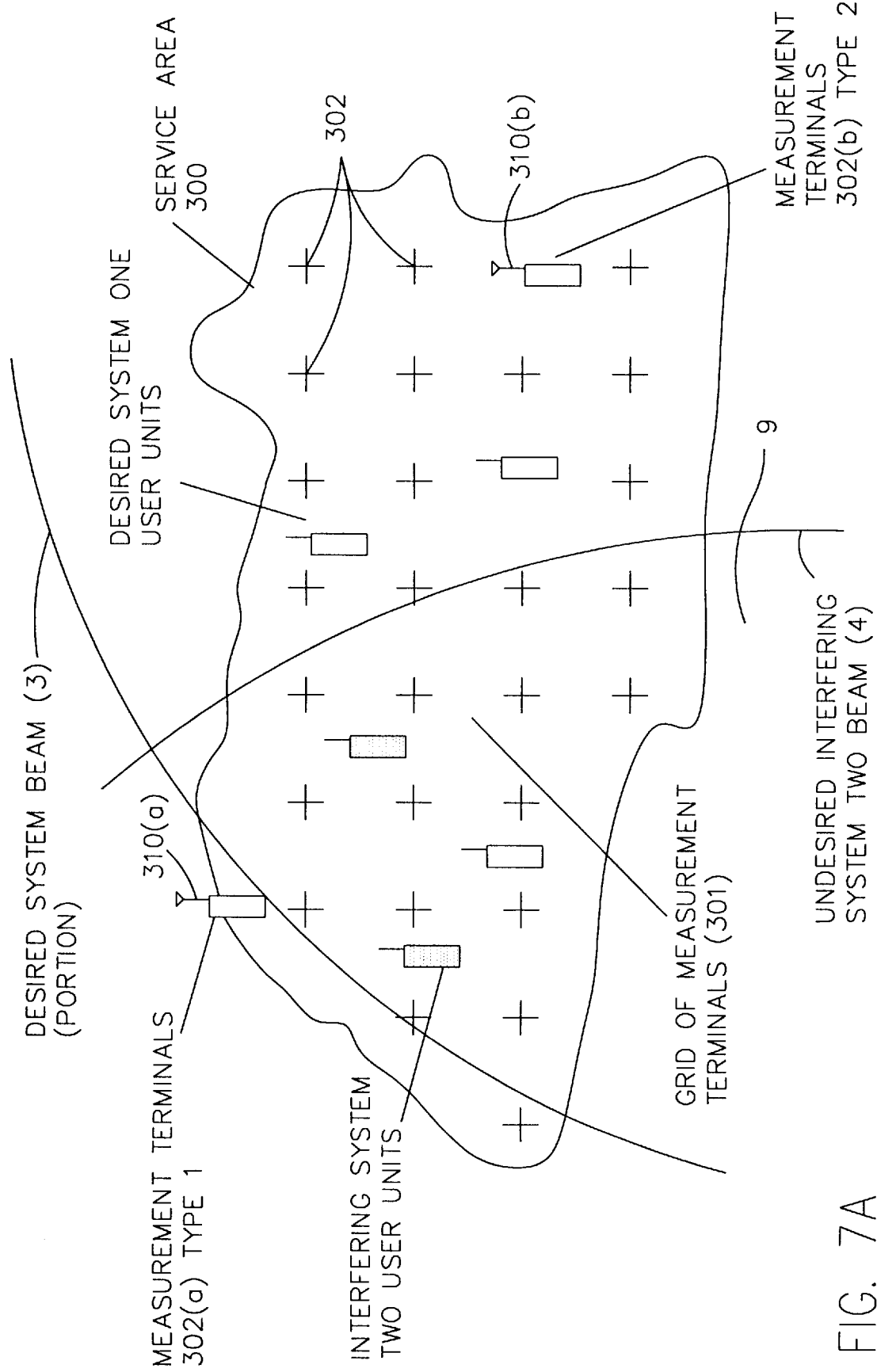
FIG. 7A illustrates an exemplary satellite coverage area and a grid comprised of first and second types of measurements terminals in accordance with an aspect of this invention.
Figure 7B:
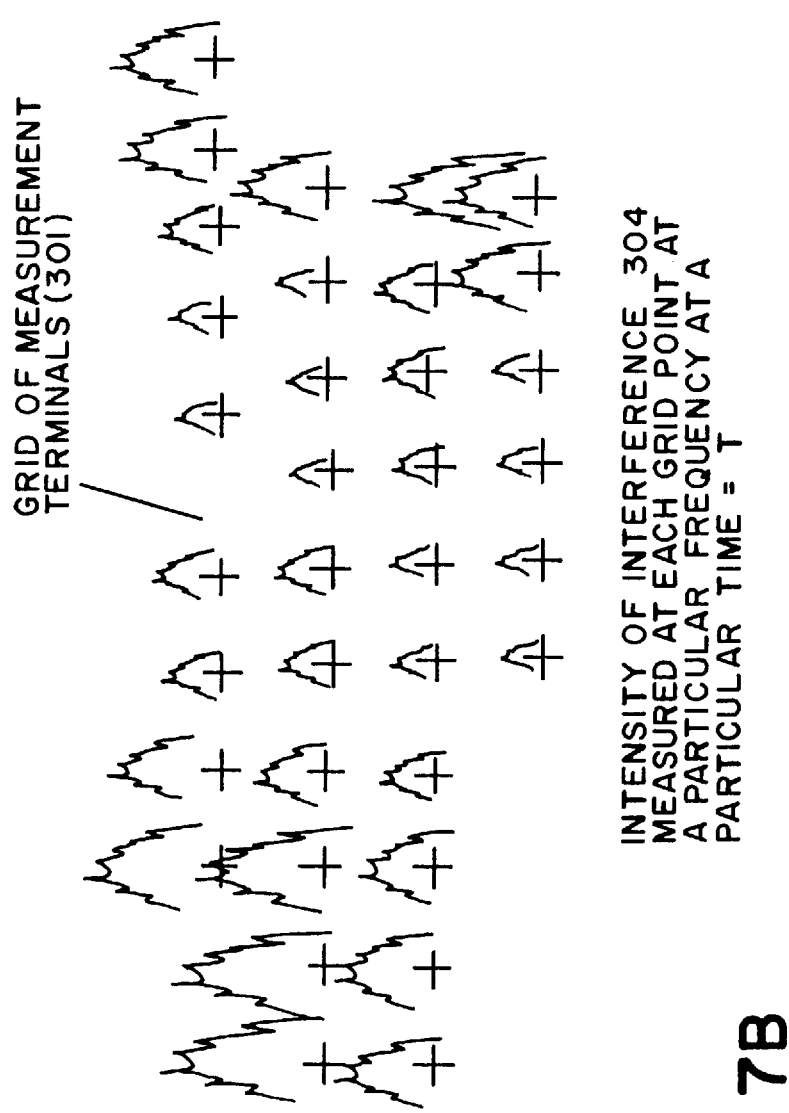
FIG. 7B shows an exemplary graphing of the intensity of interference measured by the grid of measurement terminals of FIG. 7A.

Referring now to FIGS. 7A, 7B and 8, within a desired service area 300 a grid 301 of measurement terminals 302(a) or 302(b), or combinations of type 302(a) and type 302(b), are provided. These measurement terminals (referred to collectively as measurement terminals 302) are capable of receiving the frequency band of interest for System One. The measurement terminals 302 are located at specified, known grid positions or points in the service area 300 of System One 10. As such, it should be realized that each grid point (+) represents a measurement terminal 302. The service area 300 is not necessarily limited by any physical, geographic, or political boundary, and could cover the entire earth. However, by example, a small area, typically the size of a county (e.g., some hundreds or thousands of square kilometers), is considered herein. The measurement terminals 302 are placed in locations which are free of any obstructions, trees, or buildings, and have line of sight communications to and from the desired satellite(s). The spacing between measurement terminals 302, or grid resolution, is determined by the desired resolution of the interference. The measurement terminals 302 may have omni-directional antennas 310(a) (type 1) or may have directional antennas 310(b) (type 2) for increased data fidelity. Also within the service area 300 may be located user terminals receiving communications from the desired System One 10 using beam 3 and those receiving communications from the interfering System Two using beam 4. External interference at the various grid points may also be present. Each of the measurement terminals 302 measures the interference level 304 that it is receiving at time "T", as shown in FIG. 7B. An aggregation of the measured interference levels 304 is used to produce a map 305 (see FIG. 8) of resultant interference over the band of frequencies at various grid points at time slice T. A compilation of such time slices therefore gives a historical "picture" of frequency utilization by System Two 10, and any external interference, referenced to a point or aggregation of the grid points 301 in the service area 300.

In this manner the distribution of interference with respect to time, frequency, and intensity is known, and the victim(s) of this interference can thus be assigned and reassigned intelligently to a lower interference FDM channel or channels at various locations within the coverage area 300. By example, it may be determined that frequency channels 5, 6 and 7 typically experience significant interference between 5:15 and 6:20 P.M. at certain grid point locations. In this case certain user terminals in the affected area can be reassigned to other frequency channels beginning at 5:15, and/or a user terminal requesting service at 5:14 in an affected area may be initially assigned to frequency channel 4, even though there is sufficient capacity in one of the channels 5, 6 or 7 to accommodate the user terminal.

Furthermore, predictive planning based on historical data base information can be used to allocate frequencies to various gateways in the desired system 10 to avoid those frequencies that are expected to be used by the interfering system (e.g., the System Two 20) at certain times, a particularly important feature if the interfering system is a terrestrial system. This predictive planning may be performed by a ground operations control center 460 of a type shown in FIG. 14.

Figure 9:
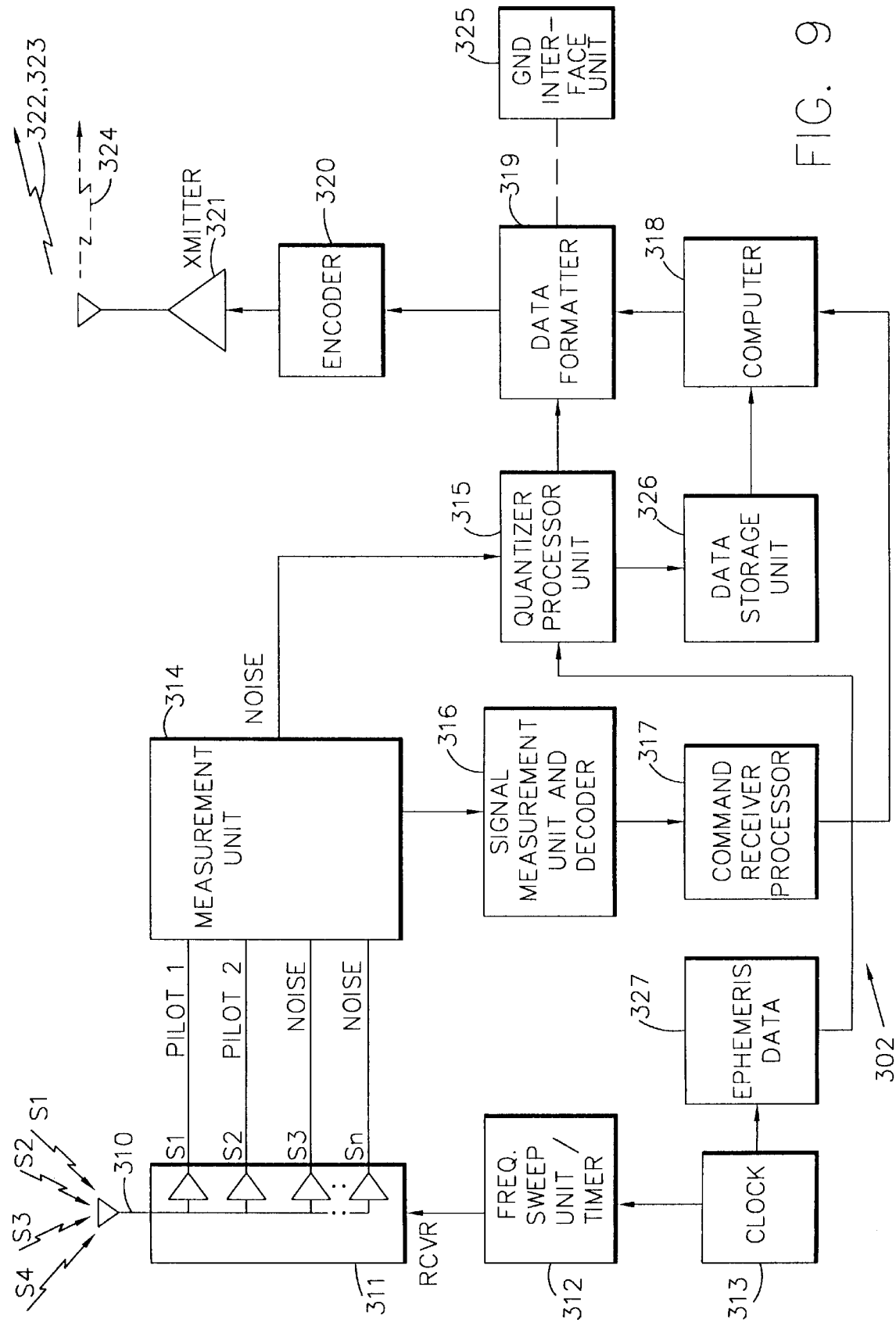
FIG. 9 is a block diagram of one of the measurement terminals shown in FIG. 7A.

FIG. 9 illustrates a block diagram of the measurement terminals 302. The measurement terminal 302 includes a receive antenna 310 which may be the omni-directional antenna 310 (a) for the type 1 measurement terminals 302 (a), or the directional antenna 310(b) for the type 2 measurement terminals 302 (b). The antenna 310 is connected to, by example, a rake receiver 311 which is capable of receiving signals from the desired system and/or the interfering system, and/or external interference. The rake receiver 311 is capable of receiving various channels either simultaneously, or by changing frequency sub-bands. Alternatively, a suitable spectrum measuring device (such as a spectrum analyzer) may be used in place of the rake receiver. A frequency sweep unit/timer 312 with a clock 313 is connected to control the receive frequency being used by the measurement terminal 302 at any given time. The frequency sweep unit/timer 312 may cause the frequency to sweep systematically through the available channels, dwell on one or more, vary the duration of time slices T, or be manipulated in various ways. In any case, the output of the receiver 311 is connected to a measurement unit 314, the output of which is connected to both a quantizer processor unit 315 for interference noise processing, and to a signal measurement unit and decoder 316 for processing any desired system signals and/or commands that are intended for the measurement terminal 302. That is, each of the measurement terminals 302 is preferably separately addressable, although it is within the scope of this invention to address all or a sub-set of the measurement terminals in a broadcast mode for providing the same command or commands to a plurality of the measurement terminals 302.

The output of the signal measurement unit 316 is connected to a command receiver/processor 317 which formats any commands for input to the measurement terminal computer 318. The output of the quantizer processor unit 315 is connected to a data storage unit 326 used for storing output data from the quantizer processor unit 315 for later transmission. For near real time data retrieval an output of the quantizer processor unit 315 is connected to a data formatter 319 which formats the data for transmission to the gateway 200 or other suitable facility. Likewise, the data from the storage unit 326 can be processed by the computer 318 and sent to the data formatter 319. In either case the data is sent to a suitable encoder 320 and thence to a transmitter 321 for relay to the gateway. This transmission may be alternatively the desired System One satellite or constellation 322, a separate satellite system 323, or via an optional wireless terrestrial link 324. Alternatively, the output of the data formatter 319 can be connected to a terrestrial ground data interface 325, such as the Internet, or any other public or private network for transmission to the facility which is controlling the frequency of the victim user terminal 30. A satellite ephemeris data unit 327 may also be provided for outputting satellite ephemeris data to the quantizer processor unit 315.

In FIG. 9 S1–Sn represent the amplified signals received from different satellites (of the desired and/or interfering system) and from different terrestrial sources of interference. The output of the ephemeris data unit 327, together with noise measurements from the measurement unit 313, are quantized in block 315 and stored in the data storage unit 26. The ephemeris information is used to define the satellite positions at which the measured noise is received.

Using the output of the measurement unit 302 the gateway 200 is enabled to make intelligent decisions regarding the reassignment of user terminals in order to optimize the assignment of user terminals to FDM channels.

Referring to FIGS. 10A–10C, this process proceeds as follows. Referring to FIG. 10A, at time=T1 the measurement terminal 302 makes a measurement of the interference noise (plotted as intensity) over the frequency spectrum of interest (e.g., from FDM channel 1 to FDM channel n). While some of the next described processing is possible at the measurement terminal 302, the processing is assumed herein to be accomplished at the gateway 202. Since the self interference can be calculated by the gateway 200 according to the gateway's knowledge of the user terminals that it is serving and their positions, frequency channel, and power levels, this component of the interference is subtracted from the measured intensity. The resulting intensity level, after processing by the gateway 200, is shown in FIG. 10B. A time history of this intensity may be mapped and used to process the assignment of user terminals.

By observing the resultant interference intensity over time an inference of external interference can be made. This is because of the potential movement of System Two, or other time related events, in other sources of external interference. For example, consider that beam 4 of System Two is moving with respect to the ground, alternatively covering and uncovering the grid points (refer again to FIG. 7A). By observing this intensity and relating it to the diagram of FIG. 10B, an estimate can be made of external interference which is not varying with time. FIG. 10C illustrates the resulting "background" interference after the removal of the varying interference component due to System Two 20. This information may then be employed by the gateway 200 to make long term planning of user terminal frequency channel assignments.

In accordance with a third method of this invention, and in order to accurately determine directly the power level being transmitted by the interfering system, the highly directional antenna 310(b) is used. The antenna 310(b) is coupled to the measurement unit 314 that tracks a satellite 2 of the System Two 20, or finds and tracks the direction of the external interference. As in the second method, a time history of this measurement may be generated by using a number of such antennas coupled to some number of measurement units 302 located at different grid points of the service area 300.

Having thus generally described presently preferred apparatus and methods in accordance with this invention, several alternate embodiments will now be described.

Figure 11:
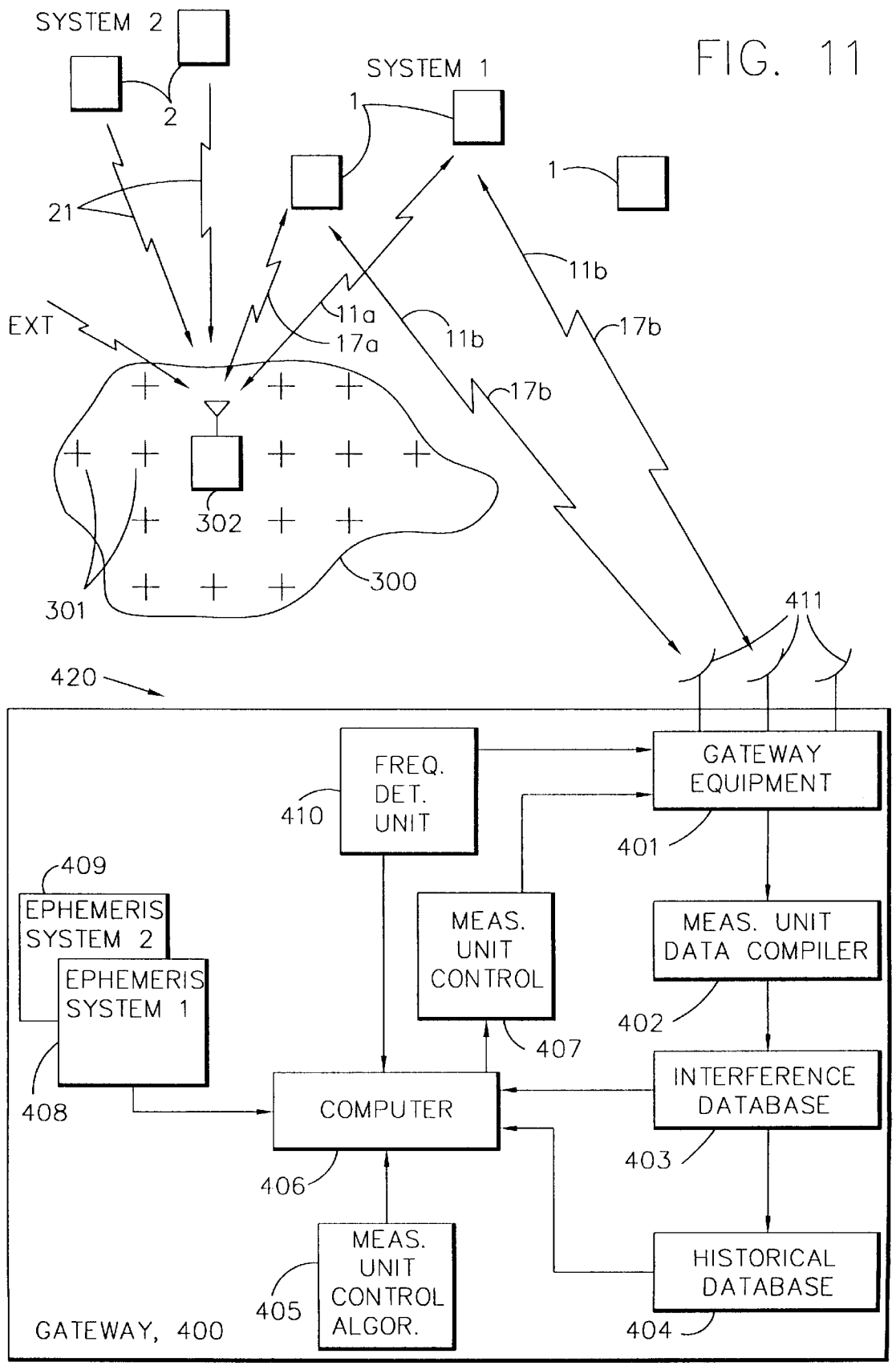
FIG. 11 is a block diagram showing a gateway and measurement terminal for the desired system.

Reference is now made to FIG. 11 for a description of a Measurement Data Retrieval System 420 for System One. In this embodiment it is assumed that satellites 2 of System Two and satellites 1 of System One are providing service to service area 300 which contains grid points 301 and measurement units 302(a) and 302(b). There are forward links 21 to user terminals (not shown) from System Two. The service area 300 is accessed by way of one or more gateways 400. The gateway 400 is connected with bi-directional radio frequency links, specifically forward and return links which connect the measurement units 302 to the gateway 400 via gateway antennas 411. The forward link is a forward feeder link 11b and a forward terminal to satellite link 11a. The return link is a return terminal to satellite link 17a and a return feeder link 17b. As an example, these links convey messages to the gateway 400 and convey messages to the user terminals within the service area 300. It is not necessary that the data be retrieved in this manner, and instead one may use an external satellite network, such as a VSAT network, or a terrestrial communications network, to accomplish the same purpose as is shown in FIGS. 12 and 13.

Referring again to FIG. 11, the signals conveying the measured interference data values as described above are received by the gateway 400 from the measurement units 302 via the satellite(s) 1 and gateway antennas 411. The interference-related information is collected, decoded, and further processed in gateway equipment 401, and is then passed to a gateway measurement unit data compiler 402 for data manipulation, mapping, and other suitable processing to perform functions described above in reference to the first and second methods. The resulting data is delivered to a mapped resultant interference database 403, and to a historical data base 404 for future use. The interference data received from the measurement units 302 may also be supplied directly to a gateway computer 406 for immediate processing in accordance with measurement unit controller algorithms 405. Satellite ephemeris data stored in unit 408 for System One and unit 409 for System Two are used by the computer 406, along with the mapped resultant interference database 403, to determine user terminal FDM channel assignments. The FDM channel assignments are used by a frequency determination unit 410 to optimize the use of the assigned spectrum. The computer 406 may also issue commands to instruct the measurement units 302 via a measurement unit controller 407. By example, commands specifying specific frequency bands and dwell times can be transmitted to the measurement units 302.

In FIG. 11 the measurement unit data compiler 402 may simply collect the information relating to interference levels in various channels. The measurement unit control algorithms 405 are used to perform the interference subtraction shown in FIGS. 10A–10C.

Figure 12:
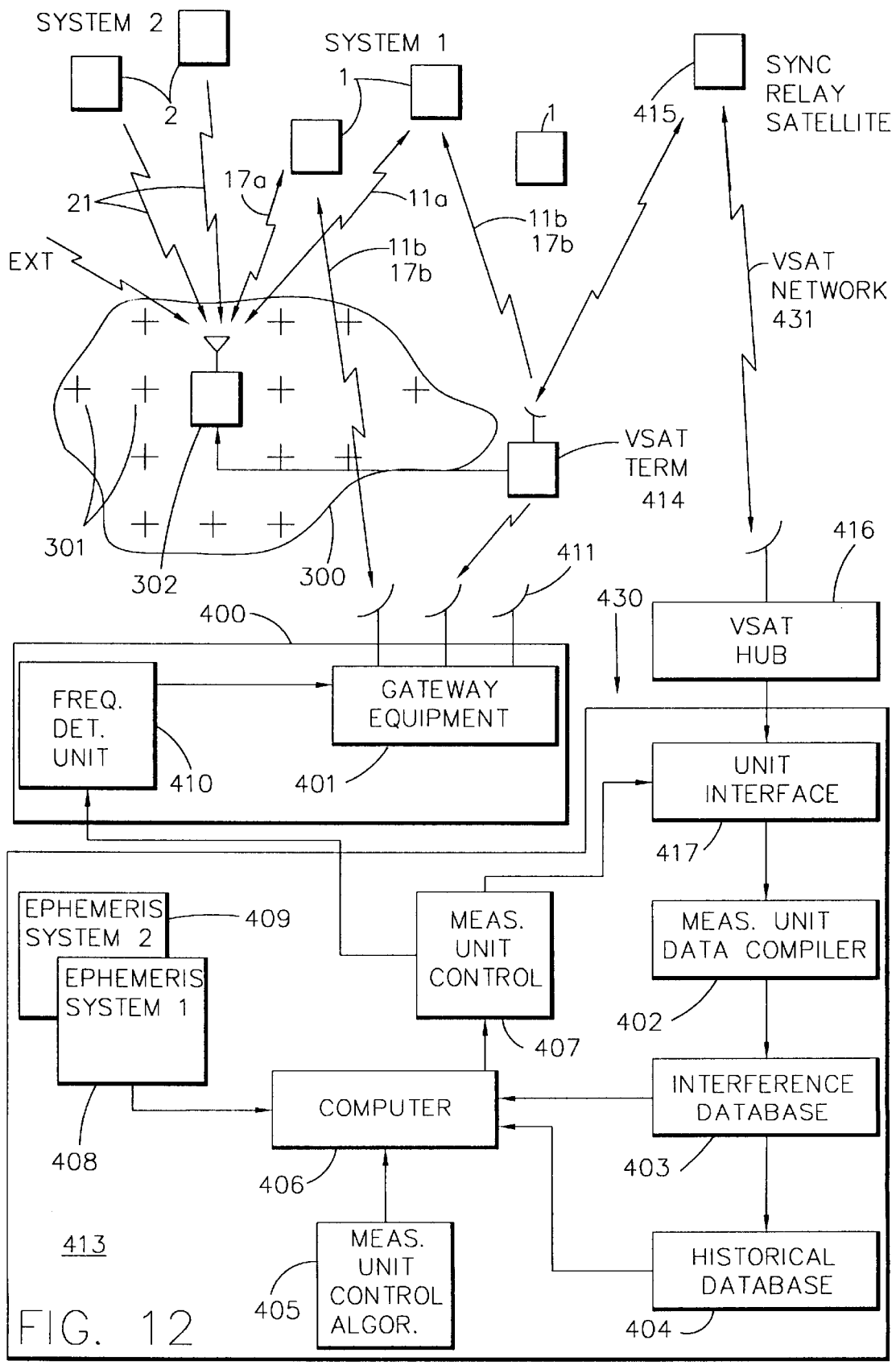
FIG. 12 is a block diagram showing another embodiment of a gateway and measurement terminal for the desired system, as modified to include a VSAT network.
Figure 13:
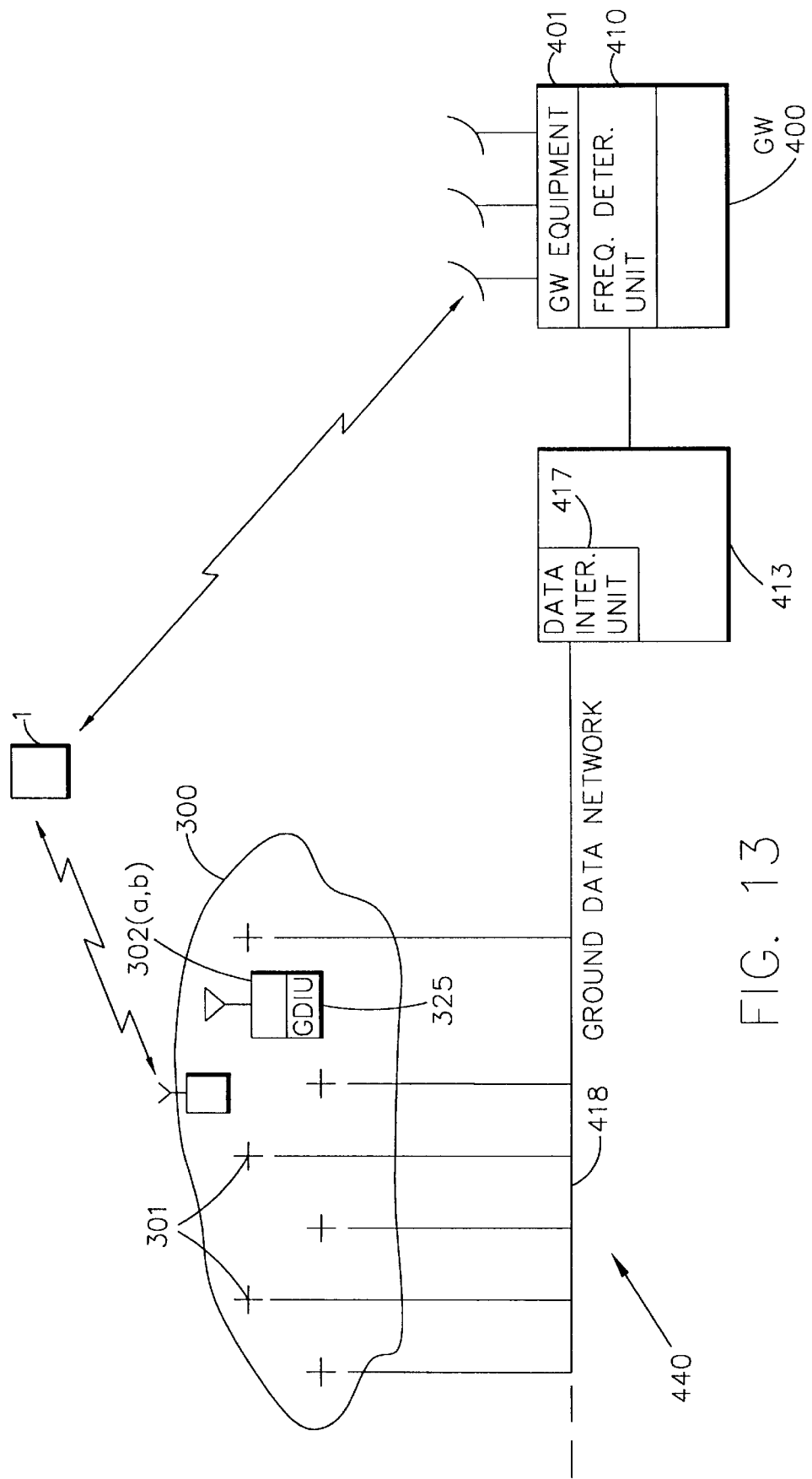
FIG. 13 illustrates the interconnection of the gateway and grid of measurement terminals though a terrestrial or ground data network (GDN).

Reference is now made to FIG. 12 for a description of a further embodiment of this invention, specifically a measurement data retrieval system 430 for System One 10 which uses an external VSAT data network 431. As before, satellite 2 of System Two 20 and satellites 1 of System One 10 are providing service to service area 300 which contains grid points 301 and measurement units 302. Communications service is provided to the user terminals using the forward and reverse links 11a, 11b, 17a, 17b as described previously. In this embodiment it is not necessary that the interference data be retrieved from the measurement units 302 by the previously described method, but instead a separate satellite network is used, such as the VSAT network 431. In this embodiment the signals conveying the measured interference data values are sent from measurement units 302 to a VSAT terminal 414, and are then transmitted to a synchronous or other relay satellite 415. The measurement unit signals are then transmitted to a VSAT hub 416 where the received signals are decoded, formatted as a data stream, and then further routed by the PSTN, data network, or other means to a remote measurement interface unit 413. The remote measurement interface unit 413 performs data manipulation, mapping, and other suitable processing to perform the functions described above in regard to Methods 1 and 2. The data interface unit 417 interfaces the data stream to the measurement unit data compiler 402, which functions as described above in reference to FIG. 11. The processed data is delivered to the mapped resultant interference database 403, and then to the historical data base 404 for future use. The processed interference data may also be provided directly to the computer 406 for immediate processing in accordance with the measurement unit controller algorithms 405. The computer 406 may also issue commands to instruct the measurement units 302, via the measurement unit controller 407. In this case the commands are sent via the VSAT network 431 and relay satellite 415 to the measurement units 302.

The measurement interface unit 413 may be collocated with the gateway 400 or remotely located. In the latter case the data to instruct the frequency determination unit 410 may be sent over various networks, including the Internet, or through the PSTN.

FIG. 13 illustrates a further embodiment of this invention, specifically a measurement data retrieval system 440 for System One 10 that uses an external ground data network (GDN) 418. As in the embodiments of FIGS. 11 and 12, satellite 2 of System Two 20 and satellites 1 of System One 10 are providing service to service area 300 which contains grid points 301 and measurement units 302. Communications service is provided to the user terminals using the forward and reverse links 11a, 11b, 17a, 17b as described previously. In this embodiment the signals conveying the measured interference data values from measurement units 302 are connected to the ground data interface unit (GDIU) 325 (see FIG. 9) for transmission via the ground data network 418, which by example may be the PSTN, Internet, or other suitable network. The data stream is connected to the measurement interface unit 413, via the data interface unit 417, as was described above in reference to FIG. 12.

The functionality of the measurement interface unit 413 is as described in regard to FIGS. 11 and 12. As with the VSAT embodiment of FIG. 12, the measurement interface unit 413 may be collocated with the gateway 400, or remotely located. The computer 406 may issue to instruct the measurement units 302 via the measurement unit controller 407. In this case the commands are sent via the ground data network 418 to the measurement units 302.

Figure 14:
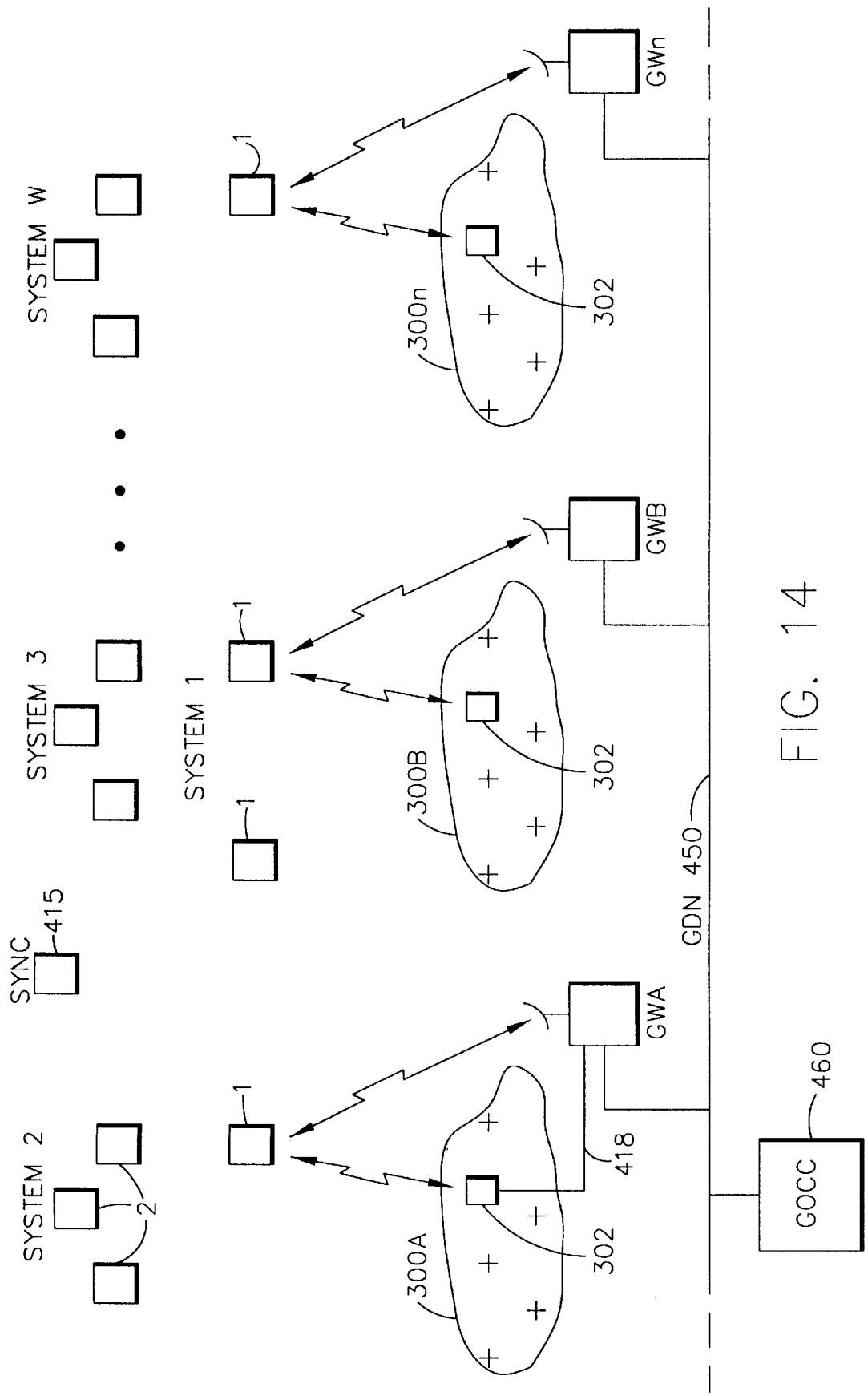
FIG. 14 depicts the interconnection of a plurality of gateways with a ground operation control center (GOCC) through the GDN.

Referring now to FIG. 14, multiple systems (i.e. System Three to System W) and multiple service areas 300A, 300B and 300C may be connected and managed from a remote location using a further GDN 450. Any of the alternative interference data retrieval systems 420, 430 or 440 may be used to deliver interference data from the measurement units 302 to the respective measurement data units/gateways (GW-A, GW-B, GW-C). The data from the multiple gateways 400 is then delivered to a ground operations control center (GOCC) 460 for performing control and frequency allocation for the entire System One. In this case the GOCC 460 may perform system-wide FDM channel planning in real-time and in a predictive mode, based on historical interference data, and allocate FDM channels to the gateways 400 so as to minimize the overall power utilization of the System One 10.

Although described above primarily in the context of CDMA communication systems, it should be understood that the teachings of this invention are not limited to only CDMA systems. It should also be appreciated that the teachings of this invention apply generally to the management of user terminal channel assignments for reassigning user terminals during a call, for initially assigning user terminals at the beginning of a call, and also when handing off a user terminal from satellite to satellite.

It should further be realized, as was noted previously, that the desired system could be a terrestrial communication system (e.g., a terrestrial CDMA system) that receives interference from some source or sources, which could be terrestrially-based or space-based interference sources.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a first satellite communications system, comprising the steps of:

during the operation of the first satellite communications system, measuring at a plurality of locations within a coverage area of the first system an amount of interference resulting at least in part from at least one second satellite communications system, the amount of interference being measured over a band of frequencies allocated to the first system;

transmitting an indication of the measured interference from each location to a central site; and in accordance with the transmitted indications, removing an effect of self-interference from the measured interference and, based at least in part on a result of removing the effect of self-interference, assigning at least one user terminal to a sub-band of frequencies within the band of frequencies so as to reduce an amount of interference experienced by the user terminal.

2. A method as set forth in claim 1, wherein the step of transmitting includes a step of transmitting the indication through at least one satellite of the first satellite communications system.

3. A method as set forth in claim 1, wherein the step of transmitting includes a step of transmitting the indication through at least one satellite of a third satellite communications system.

4. A method as set forth in claim 3, wherein the third satellite communications system is a VSAT system.

5. A method as set forth in claim 1, wherein the step of transmitting includes a step of transmitting the indication through a terrestrial data network.

6. A method as set forth in claim 1, wherein the central site is a gateway that services the coverage area.

7. A method as set forth in claim 1, wherein the central site is a control center that is bidirectionally coupled to one or more gateways that service the coverage area.

8. A method as set forth in claim 1, wherein the step of measuring is executed with a plurality of measurement terminals that are spatially distributed within the coverage area, and further comprising a step of transmitting a command to at least one of the measurement terminals, the command specifying at least one measurement parameter.

9. A method as set forth in claim 1, wherein the band of frequencies is channelized into a plurality of frequency channels, wherein the second satellite communications system transmits within a band of frequencies that overlaps the first band of frequencies, and wherein the step of assigning assigns the user terminal from a first frequency channel to a second frequency channel.

10. A method as set forth in claim 1, wherein the step of transmitting includes the steps of:
   receiving the transmitted indications at the central site:
   wherein the step of removing comprises subtracting an amount of self-interference from the transmitted indications to determine an amount of externally generated interference; and further comprising a step of
   forming a historical database of the externally generated interference within the coverage area.

11. A method as set forth in claim 1, wherein the first and second satellite communications system both transmit a beam having a terrestrial footprint, and wherein the at least one user terminal is located in an overlap zone between the terrestrial footprints of the beams.

12. A method as set forth in claim 1, wherein the band of frequencies is channelized into a plurality of frequency channels, and wherein a plurality of user terminals are assigned to a same frequency channel and share the frequency channel using assigned spreading codes.

13. A method as set forth in claim 1, wherein the steps of measuring and transmitting are executed a plurality of times, and further comprising a step of storing the transmitted indications in a database representing a historical interference distribution within the coverage area, and wherein the step of assigning is performed at least in part based on a predicted interference obtained from indications stored in the database.

14. A method as set forth in claim 1, wherein the step of measuring includes a step of scanning a receiver over at least a portion of the band of frequencies, and measuring an amount of interference within a plurality of the sub-bands of frequencies.

15. A satellite communications system that operates co-frequency with at least one second satellite communications system within a band of frequencies that is channelized into a plurality of frequency channels, said satellite communications system having a terrestrial coverage area and comprising:
   at least one satellite having a beam with an associated terrestrial coverage area;
   at least one user terminal located within the beam;
   a ground station for communicating with said at least one user terminal via said at least one satellite; and
   a plurality of measurement terminals located within said terrestrial coverage area, each of said measurement terminals being bidirectionally coupled to said ground station and comprising a receiver and a measurement unit for measuring an amount of interference due to self-interference and interference from said second satellite communications system, each of said measurement terminals further comprising a transmitter for transmitting an indication of the measured interference to said ground station; wherein
   said ground station is responsive to a measured amount of interference due at least to said interference from said second satellite communications system for assigning or reassigning said at least one user terminal to a frequency channel selected for reducing an amount of power required to provide a desired quality of service to said at least one user terminal.

16. A satellite communications system as set forth in claim 15, wherein said transmitter transmits the indication through at least one satellite of the satellite communications system.

17. A satellite communications system as set forth in claim 15, wherein said transmitter transmits the indication through at least one satellite of a third satellite communications system.

18. A satellite communications system as set forth in claim 17, wherein the third satellite communications system is a VSAT system.

19. A satellite communications system as set forth in claim 15, wherein said transmitter transmits the indication through a terrestrial data network.

20. A satellite communications system as set forth in claim 15, wherein said ground station is comprised of a gateway that services the terrestrial coverage area.

21. A satellite communications system as set forth in claim 15, wherein said ground station is a control center that is bidirectionally coupled to a gateway that services the terrestrial coverage area.

22. A satellite communications system as set forth in claim 15, wherein said ground station is further comprised of a controller for transmitting a command to at least one of the measurement terminals, the command specifying at least one measurement parameter.

23. A satellite communications system as set forth in claim 15, wherein said ground station is further comprised of:
   a receiver for receiving the transmitted indications;
   a data processor for subtracting the self-interference to determine an amount of externally generated interference; and
   a data storage unit for storing a historical database of the externally generated interference within the terrestrial coverage area for use in predictively assigning or reassigning said at least one user terminal to a frequency channel.

24. A satellite communications system as set forth in claim 15, wherein said satellite communications systems each employ a beam having a terrestrial footprint, and wherein said user terminal is located in an overlap zone between the beam footprints.

25. A satellite communications system as set forth in claim 15, wherein said receiver includes a scanner for scanning said receiver over at least a portion of the band of frequencies.

26. A satellite communications system as set forth in claim 15, wherein at least one of said plurality of measurement terminals is comprised of an omni-directional antenna that is coupled to an input of said receiver.

27. A satellite communications system as set forth in claim 15, wherein at least one of said plurality of measurement terminals is comprised of a directional antenna that is coupled to an input of said receiver.

28. A method for operating a satellite communications system, comprising the steps of:

generating a database that is indicative of a variation in interference in both time and frequency within a coverage area of the satellite communications system, the step of generating using measurements made by a plurality of measurement terminals that are spatially distributed within the coverage area; and assigning or reassigning a user terminal that is located within the coverage area to a frequency channel in accordance with the generated database.

29. A method for operating a satellite communications system, comprising the steps of:

measuring interference in both time and frequency within a coverage area of the satellite communications system, the measured interference being due at least in part to user terminal frequency channel assignments made by a second satellite communications system that operates co-frequency with the satellite communications system, the step of measuring using measurements made by a plurality of measurement terminals that are spatially distributed within the coverage area; and assigning or reassigning a user terminal of the first system that is located within the coverage area to a frequency channel so as to reduce an amount of satellite power required to provide a desired level of service quality to the user terminal.

30. A method for operating a satellite communications system, comprising the steps of:

measuring interference in both time and frequency within a coverage area of the satellite communications system, the measured interference being due at least in part to frequency channel assignments made by a second satellite communications system that operates co-frequency with the satellite communications system, the step of measuring using measurements made by a plurality of measurement terminals that are spatially distributed within the coverage area;

storing the measured interference; and predictively allocating frequency channels to at least one gateway that serves the coverage area in accordance with the stored measured interference so as to reduce an amount of satellite power required to provide a desired level of service quality to user terminals serviced by the at least one gateway.

31. A method for operating a satellite communications system, comprising the steps of:

monitoring, at a gateway, return links from a plurality of user terminals to determine an amount of interference experienced by the user terminals, the user terminals being assigned to different frequency channels and communicating with the gateway via at least one satellite; and in accordance with the determined amount of interference, assigning or reassigning at least one of the user terminals to a different frequency channel so as to reduce an amount of satellite power required to provide a desired level of service quality to the user terminal.

32. A method for operating a communications system, comprising the steps of:

during the operation of the communications system, measuring at a plurality of locations within a coverage area of the communications system an amount of interference resulting from a terrestrially-based or a space-based interference source, the amount of interference being measured over a band of frequencies allocated to the communications system;

transmitting an indication of the measured interference from each location to a central site; and in accordance with the transmitted indications, removing an effect of self-interference from the measured interference and, based at least in part on a result of removing the effect of self-interference, assigning at least one user terminal of the communications system to a sub-band of frequencies within the band of frequencies so as to reduce an amount of interference experienced by the user terminal.

* * * * *